(12) United States Patent
Koros et al.

(10) Patent No.: US 6,602,415 B2
(45) Date of Patent: Aug. 5, 2003

(54) POLYMERIC MEMBRANE FOR SEPARATION OF FLUIDS UNDER ELEVATED TEMPERATURE AND/OR PRESSURE CONDITIONS

(75) Inventors: William J. Koros, Austin, TX (US); Ryan L. Burns, Austin, TX (US)

(73) Assignee: Board of Regents, The University of Texas, Austin, TX (US)

(*) Notice: Subject to any disclaimer, the term of this patent is extended or adjusted under 35 U.S.C. 154(b) by 0 days.

(21) Appl. No.: 09/781,542

(22) Filed: Feb. 9, 2001

(65) Prior Publication Data

US 2002/0153315 A1 Oct. 24, 2002

(51) Int. Cl.[7] .................. B01D 71/06; B01D 71/40; B01D 71/56
(52) U.S. Cl. ................ 210/500.38; 210/500.39; 210/500.27; 210/640; 96/13; 95/45; 95/54
(58) Field of Search ................ 210/640, 500.38, 210/500.37, 490, 654, 500.39, 500.27; 95/45, 54; 528/353; 96/13

(56) References Cited

U.S. PATENT DOCUMENTS

| | | | | |
|---|---|---|---|---|
| 3,878,109 A | * | 4/1975 | Ikeda et al. | |
| 4,113,683 A | * | 9/1978 | Kalnin et al. | |
| 5,075,419 A | * | 12/1991 | Vora et al. | |
| 5,120,825 A | * | 1/1992 | Vora et al. | |
| 5,262,056 A | * | 11/1993 | Koros et al. | |
| 5,425,801 A | * | 1/1995 | Prasad | |
| 5,599,380 A | * | 2/1997 | Koros | |
| 5,972,080 A | * | 10/1999 | Negata | |

* cited by examiner

Primary Examiner—Ana Fortuna
(74) Attorney, Agent, or Firm—Meyertons, Hood, Kivlin, Kowert & Goetzel, P.C.; Eric B. Meyertons

(57) ABSTRACT

A polymeric composite may be used for forming fluid separation membranes. The fluid separation membranes may go through a separation selectivity maximum as a function of operating conditions (e.g., temperature and/or pressure). The membranes may be formed from polyamide or poly (pyrrolone-imide). Polyamides may be formed by the condensation of a tetraamine, a tetraacid, and a diamine. Poly (pyrrolone-imides) may be formed by the condensation of a polyamide.

42 Claims, 7 Drawing Sheets

POLYMERIC MEMBRANE FOR SEPARATION OF FLUIDS UNDER ELEVATED TEMPERATURE AND/OR PRESSURE CONDITIONS

BACKGROUND OF THE INVENTION

1. Field of the Invention

The present invention generally relates to polymeric membranes. Specifically, rigid polymeric membranes that go through a selectivity maximum as a function of copolymer composition and/or operating conditions, such as elevated temperature and/or feed pressure are described.

II. Brief Description of the Prior Art

The separation of one or more gases from a multicomponent mixture of gases is necessary in a large number of industries. Such separations currently are undertaken commercially by processes such as cryogenics, pressure swing adsorption, and membrane separations. In certain types of gas separations, membrane separations have been found to be economically more viable than other processes.

In a pressure-driven gas membrane separation process, one side of the gas separation membrane is contacted with a multicomponent gas mixture. Certain of the gases of the mixture permeate through the membrane faster than the other gases. Gas separation membranes thereby allow some gases to permeate through them while serving as a relative barrier to other gases. The relative gas permeation rate through the membrane is a property of the membrane material composition and its morphology.

It has been suggested in the prior art that the intrinsic permeability of a polymer membrane is a function of both gas diffusion through the membrane, controlled in part by the packing and molecular free volume of the material, and gas solubility within the material. Selectivity may be determined by the ratio of the permeabilities of two gases being separated by a material.

Transport of gases in polymers and molecular sieve materials occurs via a well known sorption-diffusion mechanism. The permeability coefficient ($P_A$) of a particular gas is the flux ($N_A$) normalized to the pressure difference across the membrane ($\Delta p_A$), and the membrane thickness (l).

$$P_A = N_A \frac{l}{\Delta p_A} \quad (1)$$

The permeability coefficient of a particular penetrant gas is also equal to the product of the diffusion coefficient ($D_A$) and the solubility coefficient ($S_A$).

$$P_A = D_A S_A \quad (2)$$

The permselectivity ($\alpha_{A/B}$) of a membrane material (also ideal selectivity) is the ratio of the permeability coefficients of a penetrant pair for the case where the downstream pressure is negligible relative to the upstream feed pressure. Substituting equation (2), the ideal permselectivity is also a product of the diffusivity selectivity and solubility selectivity of the particular gas pair.

$$\alpha_{A/B} = \frac{P_A}{P_B} = \frac{D_A}{D_B} \cdot \frac{S_A}{S_B} \quad (3)$$

The variation of gas permeability with pressure in glassy polymers is often represented by the dual mode model. Petropulos (1970); Vieth, et al. (1976); Koros, et al. (1977). The model accounts for the differences in gas transport properties in an idealized Henry's law and Langmuir domains of a glassy polymer, $$P = k_D D_D + \frac{C'_H D_H b}{1 + bp} \quad (4)$$

where $k_D$ is the Henry's law constant, $C'_H$ is the Langmuir capacity constant, p is pressure, and b is the Langmuir affinity constant. This model can be further extended to mixed gas permeability:

$$P_A = k_{DA} D_{DA} + \frac{C'_{HA} b_A D_{HA}}{1 + b_A p_A + b_B p_B} \quad (5)$$

where $p_A$ and $p_B$ are the partial pressures of gasses A and B respectively. This model is valid for a binary gas mixture of components A and B, and it only accounts for competitive sorption.

The temperature dependence of permeability for a given set of feed partial pressures is typically represented by an Arrhenius relationship:

$$P = P_o \exp\left[\frac{-E_p}{RT}\right] \quad (6)$$

where $P_o$ is a pre-exponential factor, $E_p$ is the apparent activation energy for permeation, T is the temperature of permeation in Kelvin, and R is the universal gas constant. The permeability can further be broken up into temperature dependent diffusion and sorption coefficients from equation (2). The temperature dependence of the penetrant diffusion coefficient can also be represented by an Arrhenius relationship:

$$D = D_o \exp\left[\frac{-E_d}{RT}\right] \quad (7)$$

Again $D_o$ is a pre-exponential factor, and $E_d$ is the activation energy for diffusion. The activation energy for diffusion represents the energy required for a penetrant to diffuse or "jump" from one equilibrium site within the matrix to another equilibrium site. The activation energy is related to the size of the penetrant, the rigidity of the polymer chain, as well as polymeric chain packing. The temperature dependence of sorption in polymers may be described using a thermodynamic van't Hoff expression:

$$S = S_o \exp\left[\frac{-H_s}{RT}\right] \quad (8)$$

where $S_o$ is a pre-exponential factor, and $H_s$ is the apparent heat of sorption as it combines the temperature dependence of sorption in both the Henry's law and Langmuir regions.

From transition state theory the pre-exponential for diffusion can be represented by $$D_o = e\lambda^2 \frac{kT}{h} \exp\left[\frac{S_d}{R}\right] \quad (9)$$

Here, $S_d$ is the activation entropy, $\lambda$ is the diffusive jump length, k is Boltzmann's constant, and h is Planck's constant. Substituting (9) into (3) (neglecting small differences in the jump length of similarly sized penetrants) results in the diffusive selectivity as the product of energetic and entropic terms:

$$\frac{D_A}{D_B} = \exp\left[\frac{-\Delta E_{d,A,B}}{RT}\right]\exp\left[\frac{\Delta S_{d,A,B}}{R}\right] \quad (10)$$

The diffusivity selectivity is determined by the ability of the polymer to discriminate between the penetrants on the basis of their sizes and shapes, and is governed primarily by intrasegmental motions and intersegmental packing. The diffusive selectivity will be based on both the difference in activation energy for both penetrants, $\Delta E_d$, as well as the difference in activation entropy for both penetrants, $\Delta S_d$.

Significant increases in diffusivity and diffusivity selectivity can be obtained in conventional polymers by simultaneously inhibiting intrasegmental motions and intersegmental chain packing. These results can be summarized as two principles for tailoring membrane materials:

1. Structural moieties which inhibit chain packing while simultaneously inhibiting torsional motion about flexible linkages on the polymer backbone tend to increase permeability while maintaining permselectivity;
2. Structural moieties which decrease the concentration of mobile linkages in the polymer backbone and do not significantly change intersegmental packing tend to increase permselectivity without decreasing permeability significantly.

The ratio of specific free volume to polymer specific volume, the fractional free volume, is representative of the degree of openness of the matrix. This index takes into account the filling of space by bulky side groups, but is not experimentally determined. The specific free volume is typically estimated by a group contribution method such as that of Bondi (1968) or Van Krevelen et al. (1976). The polymer specific volume is determined by dividing the molecular weight of the repeat unit by the bulk polymer density. The fractional free volume gives a measure of the degree of openness of the polymeric matrix. A relatively high fractional free volume is indicative of an open matrix, while a relatively low fractional free volume indicates a closed matrix. Materials with larger free fractional volumes are expected to have greater diffusivities (and sorption coefficients) and thus greater permeabilities than materials with smaller fractional free volumes.

Much of the work in the field has been directed to developing membranes that optimize the separation factor and total flux of a given system. It is disclosed in U.S. Pat. No. 4,717,394 to Hayes that aromatic polyimides containing the residue of alkylated aromatic diamines are useful in separating a variety of gases. Moreover, it has been reported in the literature that other polyimides, polycarbonates, polyurethanes, polysulfones and polyphenyleneoxides are useful for like purposes. U.S. Pat. No. 5,599,380 to Koros, herein incorporated by reference, discloses a polymeric membrane with a high entropic effect. U.S. Pat. No. 5,262,056 to Koros et al., herein incorporated by reference, discloses polyamide and polypyrrolone membranes for fluid separation.

U.S. Pat. No. 5,074,891 to Kohn et al. discloses certain polyimides with the residuum of a diaryl fluorine-containing diamine moiety as useful in separation processes involving, for example, $H_2$, $N_2$, $CH_4$, CO, $CO_2$, He and $O_2$. By utilizing a more rigid repeat unit than a polyimide, however, even greater permeability and permselectivity are realized. One example of such a rigid repeat unit is a polypyrrolone.

Polypyrrolones as membrane materials were proposed and studied originally for the reverse osmosis purification of water by Scott et al. (1970). The syntheses, permeabilities, solubilities and diffusivities of polyimides has been described in (Walker and Koros (1991); Koros and Walker (1991); Kim et al. (1988a, b); Kim (1988c); Coleman (1992)). Membranes that are composed of the polyamide and polypyrrolone forms of hexafluoroisopropylidene-bisphthalic anhydride are disclosed in U.S. Pat. No. 5,262,056 which is incorporated herein by reference.

It is often desirable to perform separation processes under harsh conditions of high feed pressure and/or high temperature. However, typical polymeric membranes exhibit a decline in performance in these more aggressive environments. Conventional polymeric membranes, when subjected to high feed pressure and/or high temperatures, exhibit decreased selectivity. A need therefore exists for a polymeric membrane that improves separation performance under elevated temperature and pressure conditions. Furthermore, the ability to tune selectivity by altering the temperature and/or feed pressure would also be desirable. A membrane with these qualities would have a wide number of possible applications. For instance, such a polymer would be of particular use to the petrochemical industry.

In the petrochemical industry, one of the most important processes is the separation of olefin and paraffin gases. Olefin gases, particularly ethylene and propylene, are important chemical feed stocks. Various petrochemical streams contain olefins and other saturated hydrocarbons. These streams typically originate from a catalytic cracking unit. Currently, the separation of olefin and paraffin components is done using low temperature distillation. Distillation columns are normally around 300 feet tall and contain over 200 trays. This is extremely expensive and energy intensive due to the similar volatilities of the components.

It is estimated that $1.2 \times 10^{14}$ BTU per year are used for olefin/paraffin separations. This large capital expense and exorbitant energy cost have created incentive for extensive research in this area of separations. Membrane separations have been considered as an attractive alternative. Some examples of membranes that exhibit attractive selectivity under mild conditions have been reported. (Tanaka et al. (1996); Staudt-Bickel and Koros (2000); Ilinitch et al. (1993); Lee et al. (1992); Ito et al. (1989)). In practice, high propylene/propane temperatures and pressures are preferred for economical processing. Thus, a polymer membrane that showed enhanced propylene/propane selectivity under increasingly demanding processing conditions would be of particular value. Recent gas transport studies aimed at improving current membrane performance have examined glassy polymers focusing mainly on polyimides. Tanaka et al. (1996) have reported on the highest performance polyimides to date. This data has been used to construct a preliminary propane/propylene "upper bound" trade off curve between gas permeability and selectivity, as shown in FIG. 1. The conditions chosen for the upper bound curve are 2 atm feed pressure and 35° C. The closed symbols in FIG. 1 represent pure gas polyimide data from the literature. The open symbols are pure gas data for other polymers from the literature (Tanaka et al. (1996); Staudt-Bickel and Koros (2000); Ilinitch et al. (1993); Lee et al. (1992); Ito et al. (1989); Steel (2000)). The propane/propylene upper bound trade off curve is poorly defined at this point in comparison to $O_2/N_2$ and $CO_2/CH_4$ "upper bound" curves (Robeson (1991)). It is believed that the membranes of the current invention provide performance beyond the upper bound for many gasses, including olefin/paraffin, $O_2/N_2$, and $CO_2/CH_4$ separations.

SUMMARY OF THE INVENTION

Described herein is a polymeric fluid separation membrane. In one embodiment the fluid separation membrane may be formed from the reaction product of a tetraamine, a tetraacid compound, and a diamine. The initial resulting product is a polyamide. This polyamide may be used to form a fluid separation membrane. Alternatively, the polyamide may be thermally cyclized to form a poly (pyrrolone-imide).

Fluid separation membranes formed from the herein described polyamides and poly (pyrrolone-imides) may exhibit unexpected properties when used under high temperature and/or pressure conditions. For example, when used at a relatively low first temperature and/or first pressure, the fluid separation membrane may exhibit low permeability, and low permselectivity. At an increased second temperature and/or second pressure, the fluid separation membrane may exhibit an increased permselectivity when compared to the permselectivity at the first temperature and/or pressure. The permselectivity of the fluid separation membrane may reach a maximum as the temperature and/or pressure is increased. If the temperature and/or pressure is increased to a third temperature and/or third pressure that are higher than the second temperature and/or pressure, the permselectivity may decrease.

The fluid separation membrane may be formed by adding a tetraacid compound to an amine mixture. The amine mixture may include tetramines and diamines. The tetraamine to diamine ratio may be between about 5:95 to about 100:0. After the tetraacid compound and the amines are reacted, the resulting polyamide may be filtered, washed and dried. The polyamide may be converted to a poly (pyrrolone-imide) by heating the polyamide to a temperature above about 200° C. Either the polyamide or the polyimide may be used in as a fluid separation membrane.

The above-described fluid separation membranes may be used in any fluid separation apparatus known in the art. Generally, a fluid separation apparatus includes a body in which a fluid separation membrane is disposed. A fluid inlet may be positioned downstream from the fluid separation membrane. Two fluid outlets may be positioned upstream from the fluid inlet. A first fluid outlet may be positioned downstream from the fluid separation membrane. A second fluid separation membrane may be positioned upstream or downstream from the fluid separation membrane.

During use, a fluid stream that includes at least two components (e.g., a gas stream) may be introduced into the fluid separation apparatus via the fluid separation inlet. The fluid will then contact the fluid separation membrane. The fluid separation membrane may have a differential selectivity such that one of the components in the gas stream may pass through the fluid separation membrane at a rate that is faster than the rate at which the other component passes through. Thus the faster permeating component will pass through the gas separation membrane and flow out of the fluid separation apparatus via outlet. The gas that does not permeate through the membrane may exit the fluid separation apparatus via the outlet. The fluid stream passing out of the outlet may be recycled back into the fluid separation apparatus to improve the separation of the components and to maximize the yield of purifed components.

BRIEF DESCRIPTION OF THE DRAWINGS

The above brief description as well as further objects, features and advantages of the methods and apparatus of the present invention will be more fully appreciated by reference to the following detailed description of presently preferred but nonetheless illustrative embodiments in accordance with the present invention when taken in conjunction with the accompanying drawings in which.

DETAILED DESCRIPTION OF THE INVENTION

Figure 1:
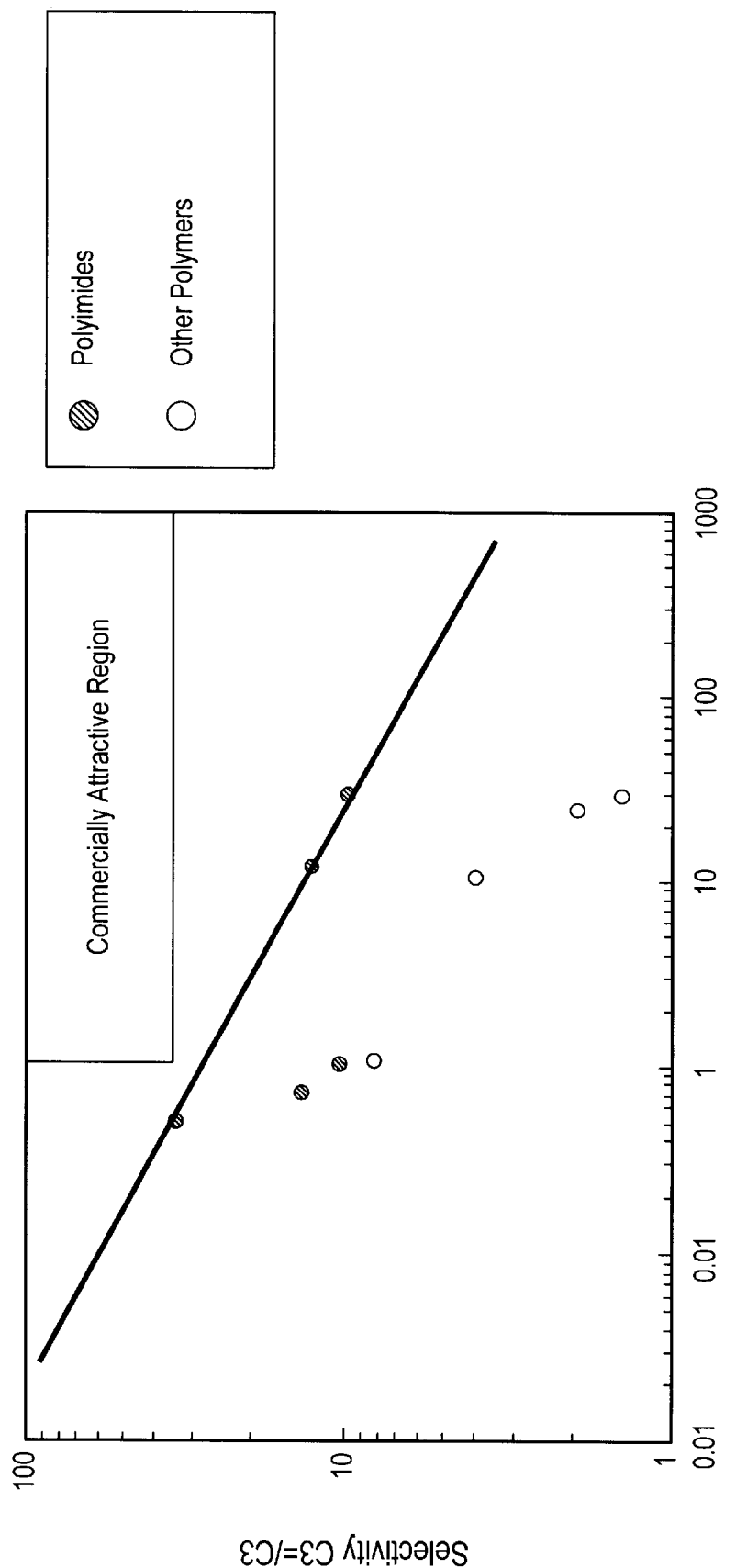
FIG. 1 depicts a $C_3H_6/C_3H_8$ upperbound tradeoff curve. Closed symbols are pure gas polyimide data from the literature. Open symbols are pure gas data for other polymers from the literature.

Poly (pyrrolone-imide) polymers are polymers derived from the condensation reaction of a tetraacid compound, a tetraamine, and a diamine. The resulting product is a polyamide. The remaining functional groups are then reacted during a thermal curing step to form the poly (pyrrolone-imide). The polymerization may be conducted in an aprotic polar solvent capable of dissolving the monomers.

Tetraacid Compound

Tetraacid compounds, as used herein, include compounds that include at least four carboxylic acid groups and compounds that are derivatives of such compounds. Examples of tetraacid compounds include tetraacids, dianhydrides, and bis-ortho-ester-acid halides. Preferably the tetraacid compound is an aromatic tetraacid or an aromatic tetraacid derivative. Aromatic tetraacid compounds tend to produce a rigid, thermally stable, productive and selective membrane material.

Tetraacids may be used to form the polyamide precursor polymer. The acid groups, in some embodiments, may be paired into ortho pairs that are separated by at least three atoms as shown in structures (1–3) below. The simplest compound to meet these requirements would be 1,2,4,5-benzene tetracarboxylic acid, shown as (1). The two ortho pairs are the 1,2 pair and the 4,5 pair, and three atoms lie between the carbons of the acid groups of non-ortho pairs. Other compounds include pyridine tetraacids (e.g., structure (2)) and pyrazine tetraacids (e.g., structure (3)).

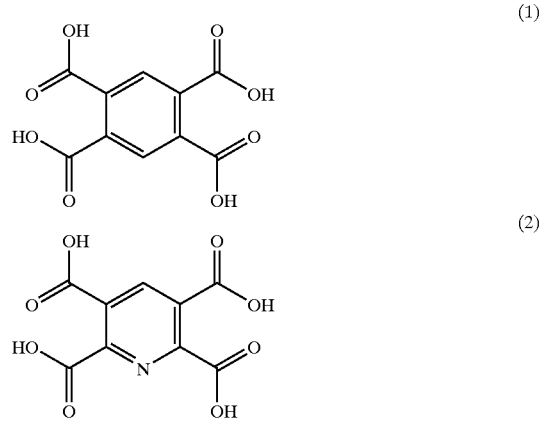

-continued

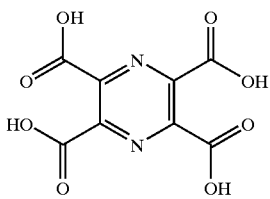
(3)

Tetraacids, however, may lack the reactivity to produce high molecular weight polymer. One way to increase the reactivity of the tetraacid compound is to convert the tetraacid into a dianhydride. Dianhydrides may be prepared from the corresponding tetraacids by heating to 230° C. in a vacuum or by refluxing the tetraacid with acetic anhydride. Examples of dianhydrides are shown as structures (4)–(6). The dianhydrides shown (4)–(6) are the dianhydrides that would be derived from the tetraacids (1)–(3) respectively.

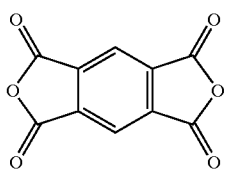
(4)

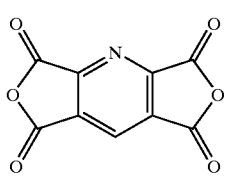
(5)

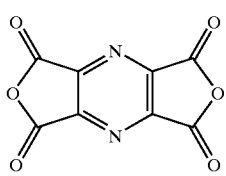
(6)

Naphthalene tetraacid derivatives may also be used. Naphthalene derivatives include carboxylic acid groups that may be either ortho-paired or para-paired. Naphthalene tetraacid derivatives include compounds having the general structure (7).

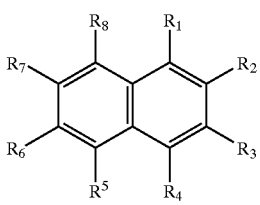

Ortho-paired and para-paired derivatives include compounds in which at least one of the pairs: $R_1$ and $R_2$; $R_2$ and $R_3$; $R_3$ and $R_4$; $R_1$ and $R_8$; and $R_1$ and $R_4$ is a paired carboxylic acid groups; and at least one of the pairs: $R_5$ and $R_6$; $R_6$ and $R_7$; $R_7$ and $R_8$; $R_4$ and $R_5$; and $R_5$ and $R_8$ is a paired carboxylic acid group. An example of a para-paired naphthalene type monomer would be 1,4,5,8-naphthalene tetracarboxylic acid. Ortho-paired naphthalene tetraacid derivatives include 1,2,5,6-naphthalene tetracarboxylic acid (8) and 2,3,6,7-naphthalene tetracarboxylic acid (9).

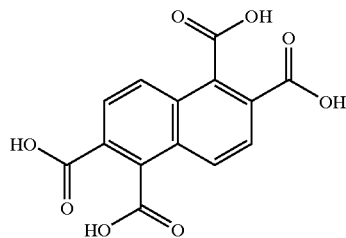
(8)

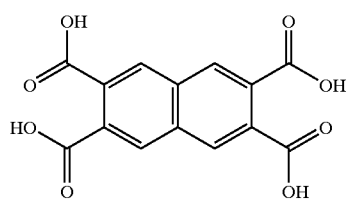
(9)

Naphthalene dianhydrides may also be used. Naphthalene dianhydrides may be prepared from the corresponding tetraacids by heating to 230° C. in a vacuum or by refluxing the tetraacid with acetic anhydride. Examples of naphthalene dianhydrides are shown as structures (10) and (11) which correspond to the dianhydrides that would be derived from the naphthalene tetracarboxylic acids (8) and (9) respectively.

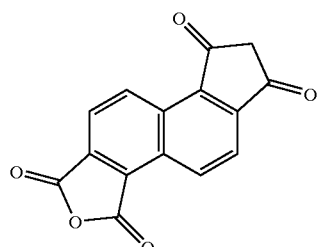
(10)

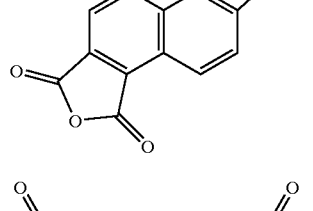
(11)

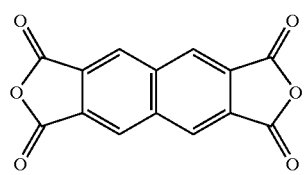

Other tetraacids may include aromatic bis-(ortho-dicarboxylic acids) and aromatic bis-(ortho-di-acid anhydrides). Generally, these compounds include a bis aromatic structure to which carboxylic acids and/or anhydrides are attached. Examples of these compounds include aromatic bis-(ortho-dicarboxylic acids) (12) and aromatic bis-(ortho-di-acid anhydrides) (13).

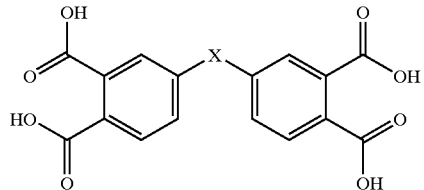
(12)

-continued

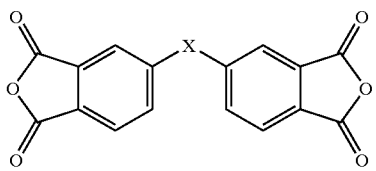
(13)

where X is a suitable linking group. Examples of linking groups include elemental linkages such as NH, O, or S. Other groups include $CH_2$, C(O), $CH(CH_3)$, $C(CH_3)_2$, $C(CF_3)_2$, $C(CH_3)Ph$, $C(Ph)_2$, cyclohexyl, sulfoxide, sulfonate. Other linking groups may include compounds having the structures (14)–(17).

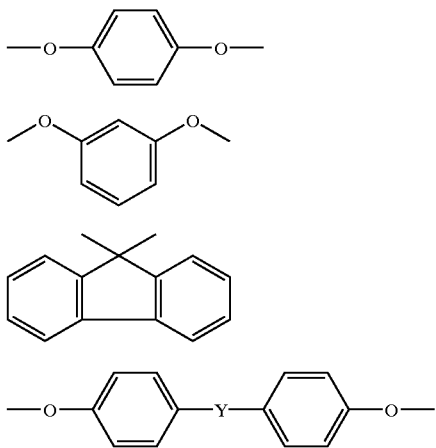

(14)

(15)

(16)

(17)

where Y is any of the other linking groups X. Alternatively, the linking group, X may represent a direct connection between the two aromatic groups such as depicted for the dianhydride (18).

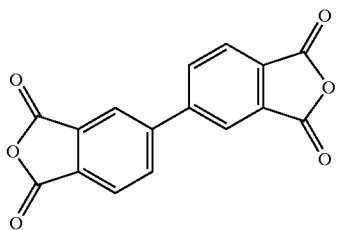
(18)

Another reactive tetraacid derivative is an acid chloride derivative. This type of compound may be prepared from any of the above described dianhydrides by reaction with an alcohol to form a bis-(ortho-acid-ester) followed by reaction to convert acid groups to acid halides. This method prepares a very reactive monomer, but this reactivity makes the monomer more water sensitive. Additionally, larger, more slowly diffusive side product alcohol groups are given off during the final cure of the polyamide to the polypyrrolone. With either the dianhydride or bis-ortho-ester-acid halide, preferably chloride, the functionality of the monomer is two, leading to linear polymer formation.

Tetraamines

Tetraamines, as used herein, include compounds that include at least four amine groups. Preferably the tetraamine is an aromatic tetraamine. Aromatic tetraamine compounds tend to produce a rigid, thermally stable, productive and selective membrane material.

Tetraamines may be used to form the polyamide precursor polymer. The amine groups, in some embodiments, may be paired into ortho pairs that are separated by at least three atoms as shown in structures (18–20) below. The simplest compound to meet these requirements would be 1,2,4,5-tetraminobenzene tetracarboxylic acid, shown as (18). The two ortho pairs are the 1,2 pair and the 4,5 pair, and three atoms lie between the carbons of the acid groups of non-ortho pairs. Other compounds include pyridine tetraacids (e.g., structure (19)) and pyrazine tetraacids (e.g., structure (20)).

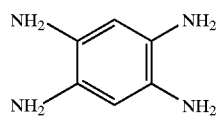
(18)

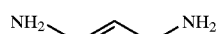
(19)

(20)

Naphthalene tetraamines may also be used. Naphthalene tetraamines include amine groups that may be either ortho-paired or para-paired. Naphthalene tetraamine derivatives include compounds having the general structure (21).

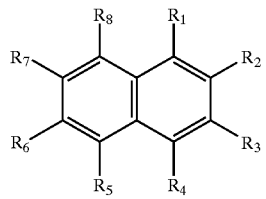
(21)

Ortho-paired and para-paired derivatives include compounds in which at least one of the pairs: $R_1$ and $R_2$; $R_2$ and $R_3$; $R_3$ and $R_4$; $R_1$ and $R_8$; and $R_1$ and $R_4$ is a pair of amine groups; and at least one of the pairs: $R_5$ and $R_6$; $R_6$ and $R_7$; $R_7$ and $R_8$; $R_4$ and $R_5$; and $R_5$ and $R_8$ is a pair of amine groups. An example of a para-paired naphthalene type monomer would be 1,4,5,8-tetraminonaphthalene (22). Ortho-paired naphthalene tetraamines include 1,2,5,6-tetraminonaphthalene (23) and 2,3,6,7-tetraaminonaphthalene (24).

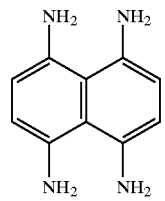
(22)

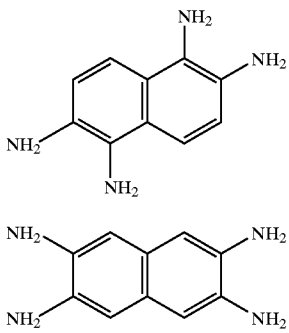
(23)

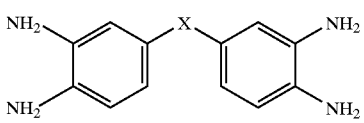
(24)

Other tetraacids may include aromatic bis-(ortho-diamines) (25). Generally, these compounds include a bis aromatic structure with amines attached to the aromatic groups. The linking group, X, may be the same as described above for the tetraacid dervitives.

(25)

Other fused ring systems such as fluorine (26) and tetramethyl-spiro-biindane (27) may also serve as substrates for tetraamines (as depicted) or tetracarboxylic acid derivatives. However, all four of the acid or amino groups need not be attached to different ring, provided the four are split into ortho-pairs or para-pairs.

(26)

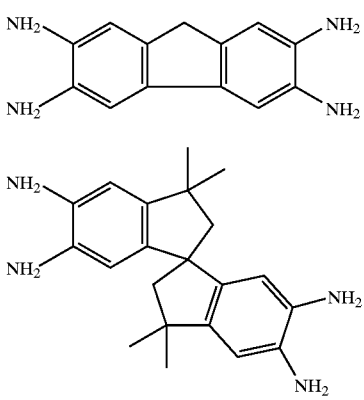
(27)

The tetraamines may be obtained either commercially, or by the reduction of a nitro compound, or may be synthesized in three steps from a bisphenol. The method for synthesis of tetraamine from bisphenol involves the nitration of the bisphenol, the nucleophilic exchange of the hydroxyl groups for amino groups, and reduction of the amino groups. The exchange of the hydroxyl groups for amino groups is similar to the procedure described in U.S. Pat. No. 2,894,988 for the conversion of nitro-cresols to nitro-toluidines. Spirobiindane-bisphenol, which serves as a basis for useful gas separating polycarbonates, can thus be converted to a tetraamine (12) for polypyrrolone synthesis of fluid separation materials. The synthesis of other teteramines and tetraacids is described in U.S. Pat. No. 5,262,056 to Koros et al. which is incorporated herein by reference.

Diamines

Diamines are, generally, molecules that include at least two amine groups. In one embodiment, aromatic diamines may be used. Aromatic diamines may be benzene based (28) or naphthalene based (29).

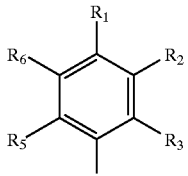
(28)

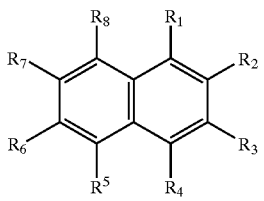
(29)

where, for benzene derivatives, meta or parasubstituted diamines may be used. As depicted in structre (28) $R_1$ and either $R_3$ or $R_4$ may be $NH_2$, where the remaining pendant groups are H or a $C_1$ to $C_{12}$ hydrocarbon. For naphthalene derivatives, at least two of $R_1$, $R_2$, $R_3$, $R_4$, $R_5$, $R_6$, $R_7$, and $R_8$ are $NH_2$ with the $NH_2$ groups being in an meta- or para orientation, the remaining pendant groups are H or a $C_1$ to $C_{12}$ hydrocarbon.

Synthesis of Fluid Separation Membranes

Figure 2:
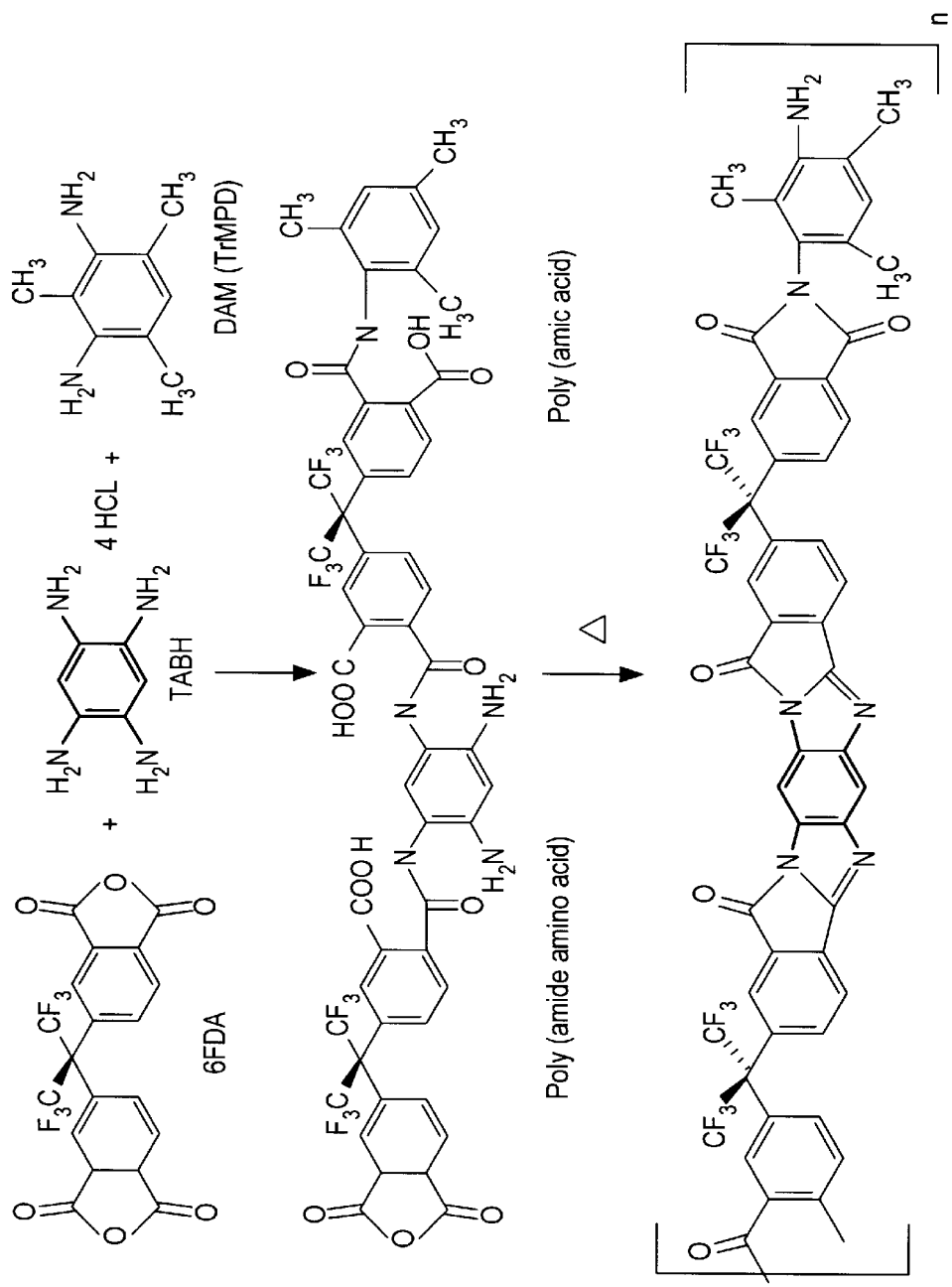
FIG. 2 shows the synthesis of the poly(pyrrolone-imide) copolymer 6FDA-TAB/DAM.

In one embodiment, a fluid separation membrane may be synthesized by the reaction of a tetraacid compound with an amine mixture that includes tetraamines and diamines. Polypyrrolones are condensation polymers obtained from the reaction of aromatic dianhydrides and aromatic tetraamines followed by complete cyclization. The polymer obtained by the initial reaction of the monomers in an aprotic solvent is a soluble poly(amide amino acid), which can be thermally cyclized to form a polypyrrolone. A Poly (pyrrolone-imide) may be synthesized in a similar manner, depicted in FIG. 2. Initially a tetraacid compound is reacted with an amine mixture that includes tetraamines and diamines. In one embodiment the ratio of tetraamine to diamine in the amine mixture may be between about 5:95 to about 100:0. A small excess of the tetraacid compound may be used. Both the tetraamines and diamines condense with the tetraacid compound to form a polyamide. The polyamide may be thermally cyclized to form the poly (pyrrolone-imide). Thermal cyclization of an amide formed between the tetraacid compound and the tetraamine will lead to a pyrrolone linkage, while thermal cyclization of an amide formed between the tetraacid compound and the diamine will lead to imide linkages. Together these linkages form a poly (pyrrolone-imide), as depicted in FIG. 2.

The reaction of the tetraacid compound and the amine mixture may be performed in a polar aprotic solvent. Aprotic solvents, generally, are solvents that neither donate or accept protons. Examples of polar aprotic solvents include, but are not limited to dimethylformamide, n-methyl pyrrolidinone, dimethylacetamide, and dimethyl sulfoxide. One or all of the components may be dissolved in a polar aprotic solvent prior to reacting the components.

A base may be added to catalyze the formation of the polyamide. In an embodiment, a tertiary amine may be added to the amine mixture prior to the addition of the tetraacid compound. Suitable tertiary bases include, but are not limited to pyridine, pyrazine, triethylamine, diisopropyl ethyl amine, 1,5-diazabicyclo[4.3.0]non-5-ene ("DBN"), 1,4-diazabicyclo[2.2.2]octane, 1,8-diazabicyclo[5.4.0]undec-7-ene.

In one embodiment, the amine mixture may be dissolved in a polar aprotic solvent and placed in a reaction vessel. The tetraacid derivative may also be dissolved in a polar aprotic solvent and added to the amine mixture. The reaction may be conducted under an oxygen free atmosphere. An oxygen free atmosphere may be obtained by replacement of the ambient air in the reaction vessels with an inert gas such as helium, nitrogen, or a nobel gas (e.g., argon). Generally, the addition of the tetraacid compound to the amine mixture may cause an exothermic condensation reaction to occur. The rate of addition of the tetraacid derivative may be adjusted to control the temperature of the reaction. The resulting polyamide may be collected, filtered and dried to remove unreacted monomers and any base that may be present.

To convert the polyamide to an poly (pyrrolone-imide) the polyamide may be heated to cause further condensation of the amides. Condensation of the resulting amide may lead to either pyrrolone or imide linking groups. Thermal cyclocondensation may occur at temperatures above about 200° C. In one embodiment, the polyamide may be placed in a mold prior to thermal cyclocondensation such that the resulting poly (pyrrolone-imide) polymer has a shape that is complementary to the shape of the mold. The polyamide may be heated under an inert atmosphere or at a pressure below about 1.0 mmHg. Performing a thermal cyclocondensation under a vacuum may help to remove water formed during the condensation reaction and help accelerate the reaction rate. Thermal cyclocondensation is performed for a period of at least about one day, preferably two to three days. The polypyrrolone resulting from cyclization possesses a repeat unit with two benzene rings joined by two fused five membered rings, imparting a great degree of thermal and chemical resistance, strength and rigidity.

Either the polyamide or the poly (pyrrolone-imide) may be used as fluid separation membranes. Methods for forming and testing fluid separation membranes are described in detail in U.S. Pat. No. 5,262,056 to Koros which is incorporated herein by reference. The membranes described herein go through a selectivity maximum for certain gases as a function of temperature and/or feed pressure. The membranes of the present invention may be either composite or asymmetric membranes.

It is believed that these two unusual results are most pronounced in membranes that are composed of flat, rigid polymer repeat units. The term "rigid" as used herein means that models of the polymer structure show less than plus or minus 15 degrees of rotational motion around backbone bonds within the structure that comprise at least 25% of the backbone atoms. These rigid polymers mimic the effects of carbon molecular sieves in that bottleneck openings exist within the polymer that allow some gasses to pass though the polymer while preventing relatively larger gasses from diffusing though. Preferably, the membranes of the present invention are composed of ladder or semi-ladder polymers which exhibit limited intersegmental motion and also pack into molecular size selective regions. Ladder polymers contain a double stranded backbone, while in semi-ladder polymers, some of the monomers in the backbone are connected around aromatic bonds, while others are connected with only a single bond. The double stranded backbones of the polymer helps to limit intersegmental motion. Polypyrrolones are one of many examples of rigid semi-ladder polymers.

The rigidity of the polypyrrolone repeat unit provides unusually high size and shape discrimination between the penetrants. With the incorporation of the proper linkages in the repeat unit, the intrinsic rigidity of the polypyrrolone linkage can also inhibit packing, allowing one to increase penetrant mobility without losses in selectivity.

When ladder or semi-ladder polymers pack tightly, they are relatively impermeable. The polymers may be opened up by the addition of molecular spacers that create the morphology needed for gas separation based on the size difference of the molecules. The molecular spacers may be monomers that are added to the polymer and that act to prevent tight packing within the polymeric matrix.

In one embodiment, the membrane is comprised of a poly(pyrrolone-imide) copolymer that is composed of 6FDA [4,4-(hexafluoroisopropylidene) diphthalic anhydride]-TAB (1,2,4,5 tetraaminobenzene)/DAM (2,4,6 trimethyl-1,3-phenylenediamine). 6FDA is a monomer that is believed to prevent tight packing and works to open up the matrix. TAB is a monomer which is believed to be flat and packable, and therefore works to close the matrix. DAM includes methyl groups which are believed to act as spacers to prevent close packing, and thus help open up the matrix. A variety of different membrane materials, each having different permaselectivities, may be made by varying ratio of TAB to DAM.

The poly(pyrrolone-imide) 6FDA-TAB/DAM is formed via a condensation polymerization in dimethyacetamide. See FIG. 2. The synthesis procedure is set forth in the Examples that follow. The resulting precursor polymer is first solution cast on a Teflon® dish, and heated to 60° C. to induce solvent evaporation. The film is then dried in a vacuum oven before slowly heating the film to 300° C. under vacuum in order to thermally cyclize the polymer. The amount of TAB and DAM in the polymer can be controlled by varying the stoichiometry of the monomers.

Figure 7:
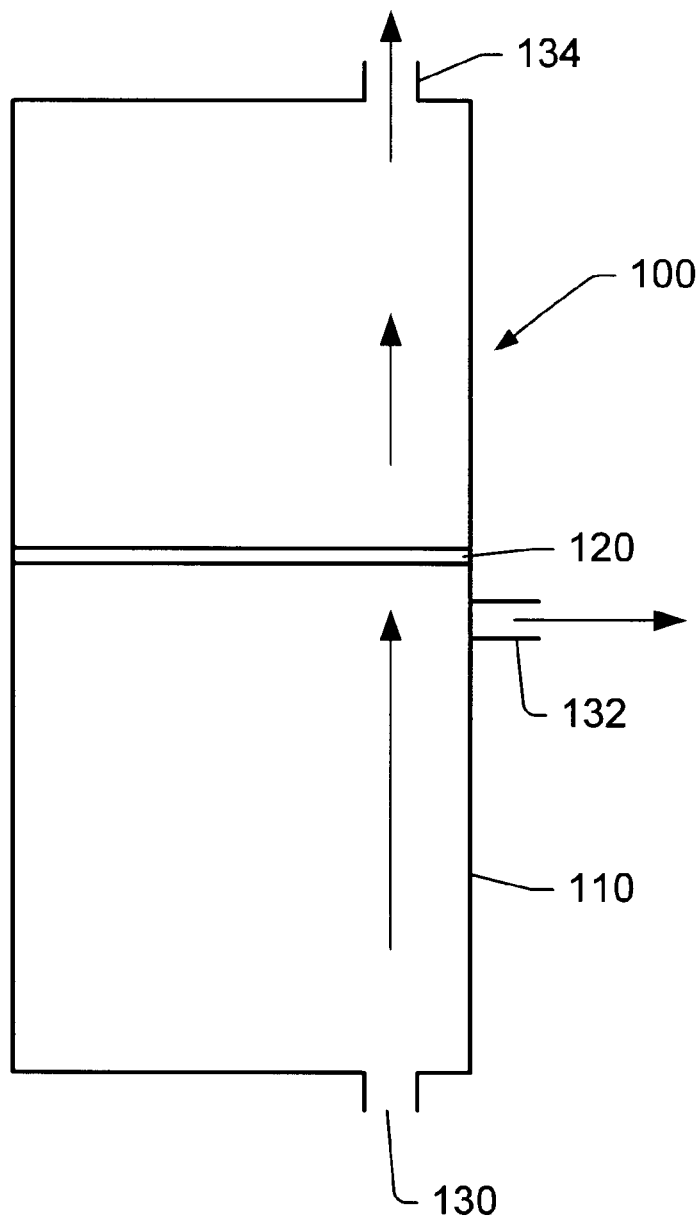
FIG. 7 depicts a fluid separation apparatus.

The above-described fluid separation membranes may be used in any fluid separation apparatus known in the art. A schematic of a fluid separation membrane is depicted in FIG. 7. Generally, a fluid separation apparatus 100 includes a body 110 in which a fluid separation membrane 120 is disposed. The fluid separation membrane 110 may be composed of any of the polymers described herein and formed by the methods described herein. A fluid inlet 130 may be positioned downstream from the fluid separation membrane 120. Two fluid outlets may be positioned upstream from the fluid inlet. A first fluid outlet 132 may be positioned downstream from the fluid separation membrane. A second fluid separation membrane 134 may be positioned upstream from the fluid separation membrane.

During use, a fluid stream that includes at least two components (e.g., a gas stream) may be introduced into the fluid separation apparatus 100 via the fluid separation inlet 130. The fluid will then contact the fluid separation membrane 120. The fluid separation membrane may have a differential selectivity such that one of the components in the gas stream may pass through the fluid separation membrane at a rate that is faster than the rate at which the other component passes through. Thus the faster permeating component will pass through the gas separation membrane and flow out of the fluid separation apparatus via outlet 134. The gas that does not permeate through the membrane may exit the fluid separation apparatus via the outlet 132. The fluid stream passing out of the outlet 132 may be recycled back into the fluid separation apparatus to improve the separation of the components and to maximize the yield of purifed components.

In one embodiment, the polymeric membranes of the current invention show a maximum in separation performance over a relatively narrow window of monotonically changing copolymer composition for separation of specific gas pairs. Typically, when the amount of packing inhibiting monomer is increased, the permeability (related to productivity) increases, but the selectivity (related to ability to separate feed components from each other) decreases. However, the herein disclosed family of membrane materials deviates highly favorably from this trend. A family of rigid polymeric membranes are disclosed that exhibit the surprising property that when the proportion of packing inhibiting monomer is increased relative to the amount of a monomer which allows for tight packing, a selectivity maximum occurs for certain gases. A selectivity maximum exists when, in response to incrementally augmenting at least one variable, such as monomer composition, temperature, or pressure, the selectivity of a particular gas or gasses increases, and reaches a peak, rather than falling monotonically with increasing permeability.

EXAMPLES

A family of 6FDA-TAB/DAM polymers were synthesized in which the TAB/DAM ratio was varied. Permeability and ideal selectivity for the various polymers were then measured for the following gas pairs: $C_3H_6/C_3H_8$, $O_2/N_2$, and $CO_2/CH_4$. All experiments were done at 2 atm feed and 35° C., and the results are shown in Table 1.

TABLE 1

Pure Gas Permeation Results for the Copolymer 6FDA-TAB/DAM (at 2 atm feed pressure and 35° C.)

| Polymer | Permeability (Barrer) | | | Ideal Selectivity | | |
|---|---|---|---|---|---|---|
| | $C_3H_6$ | $O_2$ | $CO_2$ | $C_3H_6/C_3H_8$ | $O_2/N_2$ | $CO_2/CH_4$ |
| 6FDA-TAB | 0.094 | 15.2 | 54 | 2.6 | 5.9 | 60 |
| 6FDA-TAB/DAM (75/25) | 0.498 | 15.9 | 73.7 | 4.16 | 5.16 | 44 |
| 6FDA-TAB/DAM (60/40) | 0.533 | — | — | 5.47 | — | — |
| 6FDA-TAB/DAM (50/50) | 2.3 | 20 | 155 | 23 | 3.8 | 34 |
| 6FDA-TAB/DAM | 28.7 | 109 | 370 | 10.1 | 3.7 | 21 |

The initial material tested for propane/propylene separation was the pure polypyrrolone, 6FDA-TAB. As 6FDA is a monomer which prevents tight packing while conversely TAB is a monomer which is flat and packable, it is expected that the combination of the two should allow for a polymer which packs into molecular size selective regions. The 6FDA-TAB polymer was found to exhibit high performance properties for $O_2/N_2$ separation. However, with respect to the separation of the larger $C_3H_6/C_3H_8$ molecules, the polymer essentially acted as a barrier material preventing significant permeation of both propane and propylene (P=0.094 Barrer, and ideal α=2.6). A diffusion coefficient was calculated for $C_3H_6$ in 6FDA-TAB from sorption and permeation experiments (2 atm and 35° C.) to be 4.9×10-11 cm²/s. This is 3 orders of magnitude smaller than reported for 6FDA-DAM (D=1.3×10-8 cm²/s). This large difference in diffusion coefficient of $C_3H_6$ in these materials is primarily responsible for the difference in permeability since the solubility coefficients of $C_3H_6$ are very similar (0.19 cc (STP)/cc cmHg for 6FDA-TAB compared to 0.23 cc (STP)/cc cmHg for 6FDA-DAM at 2 atm and 35° C.).

Figure 3:
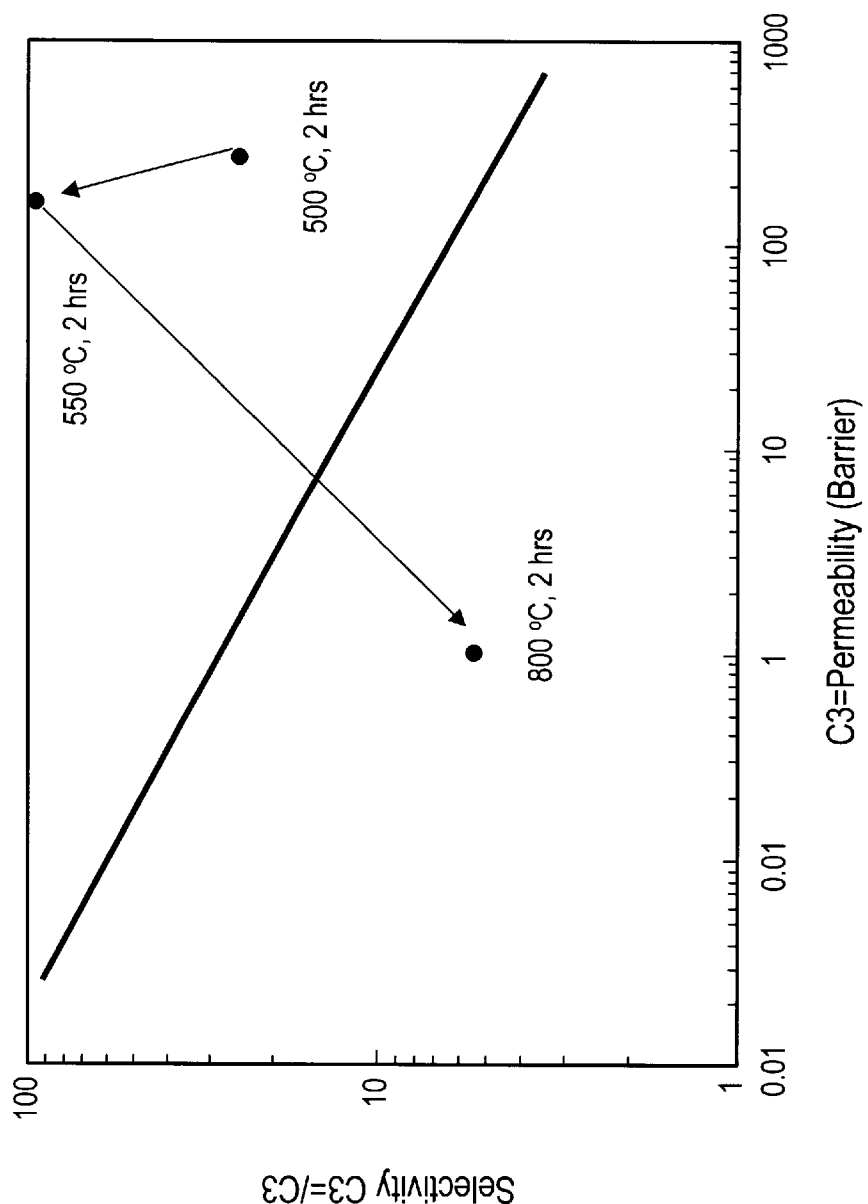
FIG. 3 shows a carbon molecular sieve $C_3H_6/C_3H_8$ separation properties.

This behavior of low flux and low selectivity has also been observed in carbon molecular sieve materials formed via a high temperature vacuum pyrolysis (Steel (2000)). For the carbons, the magnitude of the thermal treatment controls separation properties. It has previously been reported that an increased temperature in the heat treatment can cause a significant loss in both permeability and selectivity. See FIG. 3. For example, the precursor 6FDA/BPDA(50/50)-DAM has a large permeability for $C_3H_6$ and selectivity for the gas pair $C_3H_6/C_3H_8$ (P=196 Barrer, α=100) after a thermal treatment at 550° C. for 2 hours. Based on $O_2/N_2$ and $CO_2/CH_4$ results, it is expected that an increased thermal treatment would provide a slightly more packed morphology, resulting in the decrease in permeability, but with an increase in selectivity. An increased heat treatment at 800° C. for 2 hours actually provided an unexpected result in which the permeability and selectivity both decreased significantly (P=1.35 Barrer, α=6.7). It is believed the preceding trend is consistent with a morphology that packs more tightly, such that the larger size of propylene (compared to $O_2$ or $CO_2$) prevents it from diffusing through most of the more tightly packed matrix, which in turn lowers both the permeability and selectivity. It is hypothesized that the bottleneck regions in these matrices restrict rotational and translational motion of both $C_3H_6$ and $C_3H_8$. Based on these results it seems clear that there is an optimum permeability and selectivity that can be obtained by carefully tuning the thermal treatment.

Similarly it is believed that a polypyrrolone morphology, which possesses less packing than the 6FDA-TAB polymer will provide higher permeability and, most importantly, higher selectivity. It is hypothesized that tuning the carbon materials via a thermal treatment is analogous to tuning the polymer morphology using various monomer compositions.

Figure 4:
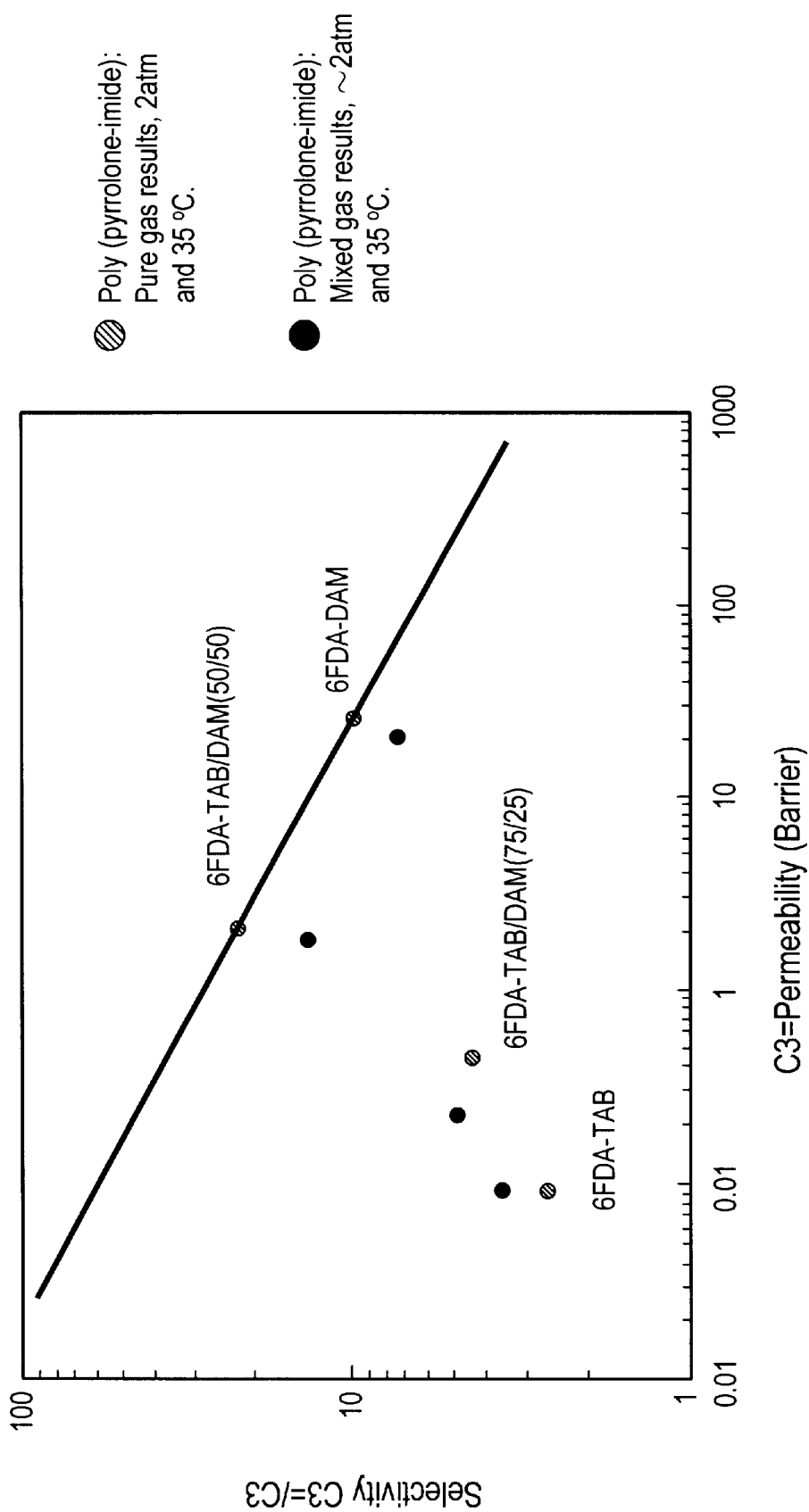
FIG. 4 shows 6FDA-DAM/TAB copolymer $C_3H_6/C_3H_8$ permeability plotted on upperbound tradeoff curve.

Consequently, 6FDA-TAB/DAM with increasing proportions of DAM were then tested. As DAM is a packing inhibitor, conventional reasoning suggests that the resulting polypyrrolone morphology, which possesses less packing than the 6FDA-TAB polymer, should provide higher permeability and lower selectivity as the proportion of DAM was increased, based on the assumption that it would become more open and less able to distinguish subtle size and shape differences between the $C_3H_6/C_3H_8$ pair. Surprisingly, this was not the case as both higher permeability and higher selectivity were observed. The poly(pyrrolone-imide) copolymers with varying tetraamine to diamine (TAB/DAM) ratios in the backbone did not produce a monotonic increase in permeability and decrease in selectivity. FIG. 4 illustrates the 6FDA-TAB/DAM copolymer $C_3H_6/C_3H_8$ permeability plotted on an upper bound tradeoff curve.

As the material becomes more open with the addition of the DAM monomer, the permeability of all penetrants increases as expected, and the selectivity of $O_2/N_2$ and $CO_2/CH_4$ decreases as is seen with conventional polymers. On the other hand, the $C_3H_6/C_3H_8$ selectivity actually increases to a maximum, and then begins to decrease. Starting with the pure polypyrrolone (6FDA-TAB), the copolymer becomes more open with the addition of DAM, and the $C_3H_6/C_3H_8$ selectivity increases, reaching a peak at 23 before decreasing down to 10.1 with the pure polyimide, 6FDA-DAM. This indicates that there is an optimum monomer composition which will provide the highest possible selectivity. This selectivity maximum will likely not only be observed for propylene/propane, but for olefin/paraffin molecules in general, as well as for other relatively large gas pairs, such as $CO_2/CH_4$. Furthermore, a selectivity maximum may also exist for smaller gases, such as the $O_2/N_2$ pair, if the experiment described above is run at lower temperatures and pressures. The specific conditions and copolymer compositions may, however, differ for the various systems.

It is evident from the data in Table 1 that there exists some threshold TAB/DAM ratio which will undergo a selectivity increase for $C_3H_6/C_3H_8$. The selectivity may increase significantly at some threshold TAB/DAM ratio, or it may gradually increase as the amount of DAM is increased relative to the amount of TAB. The increase may be the point where the average interchain spacing allows translational motion of the penetrant molecule in question, which here is propylene. It is apparent that a larger chain spacing is needed in order to allow translational motion of the larger propane molecule, thereby causing a significant increase in the diffusion coefficient. It is not clear at this point exactly where this maximum lies, however it is believed to exist between the copolymers 6FDA-TAB/DAM (50/50) and 6FDA-TAB/DAM (100/0). One of skill in the art could readily repeat this procedure with formulations between 6FDA-TAB/DAM (40/60) and 6FDA-TAB/DAM (10/90) to determine the maximum selectivity.

Figure 5:
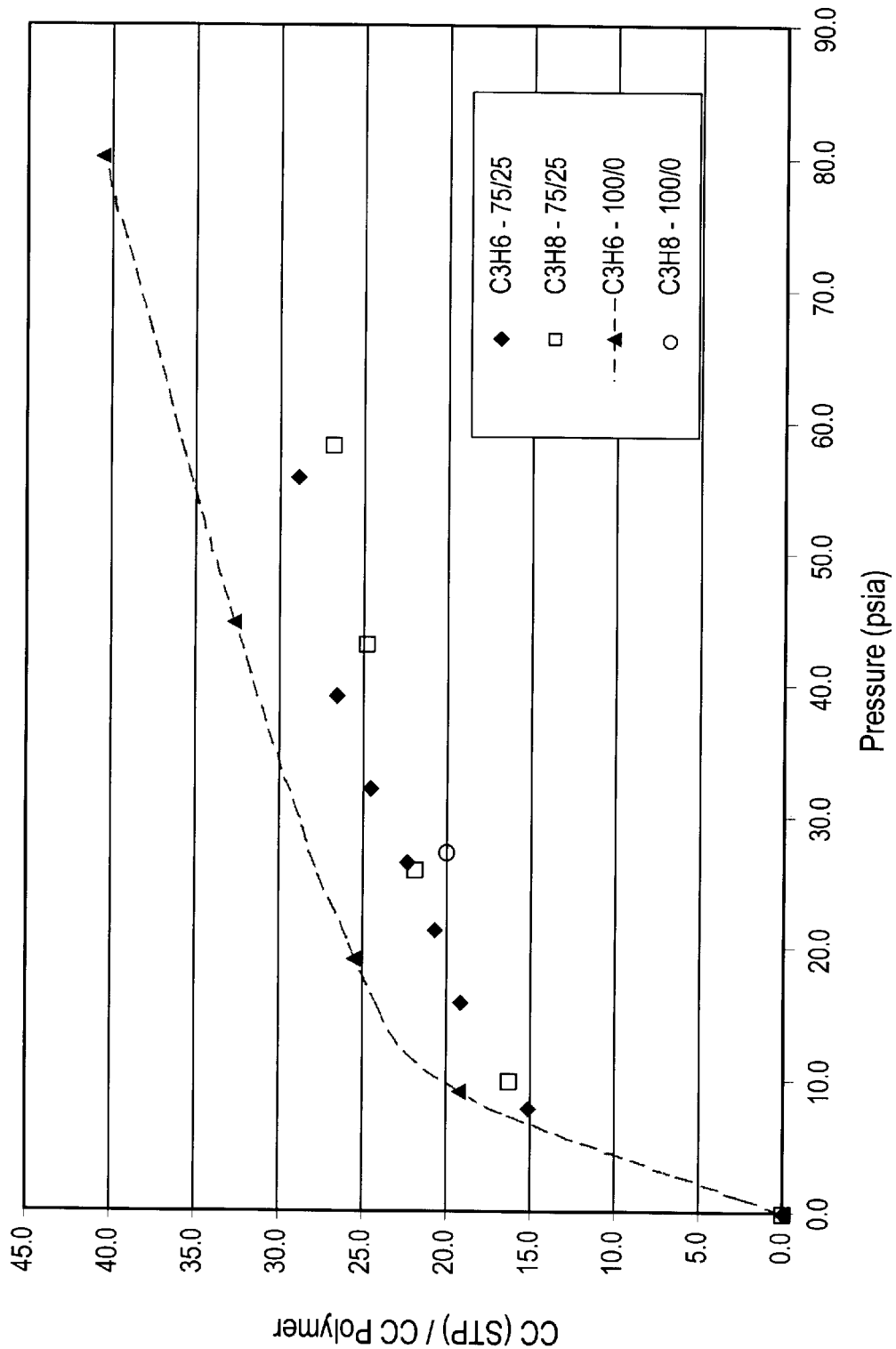
FIG. 5 shows $C_3H_6/C_3H_8$ solubility isotherms in 6FDA-TAB and 6FDA-TAB-TAB/DAM (75/25)

The preceding theory regarding translational motion of penetrant molecules can be tested using three tools. First, Wide Angle X-ray Diffraction can provide information about the interchain spacing of the polymer chains. Second, the glass transition temperature can also provide information about the polymer's rigidity, and hence it's ability to be entropically selective. Third, an entropic selectivity analysis can provide information about a particular penetrant's entropy in the normal and activated states. These methods can be used to determine whether the closed materials have low $C_3H_6/C_3H_8$ diffusion coefficients due to large activation energies or large activation entropies. These procedures may confirm the concept of inhibited translational motion, as it is believed this would be an entropic effect. Solubility isotherms for $C_3H_6/C_3H_8$ in 6FDA-TAB and 6FDA-TAB/DAM (75/25) are illustrated in FIG. 5. These materials have similar propylene/propane solubility coefficients at 2 atm and 35° C., and solubility selectivities in the range of 1–1.4. Additionally, these materials have small Henry's law solubility coefficients similar to carbon materials.

These experiments demonstrate that two domains for this family of materials are essentially created. One group can be defined as "closed" and lies to the left of the selectivity maximum. The second, which can be called "open" lies to the right of the selectivity maximum. Most materials reported to date would be classified as open. Therefore, the present invention demonstrates that a different type of material can be created using the same three monomers by simply varying the stoichiometry.

It is believed that this unusual behavior of exhibiting a selectivity maximum may be typical of flat, rigid polymeric materials. Thus, it is believed that other polypyrrolones, and in particular pyrrolone-imides, will exhibit the same behavior when the ratios of packing inhibitor monomers to monomers that allow for tight packing is altered. It is likely that selectivity maximums will occur not only for propane/propylene, but will generally occur in olefin/paraffin separations. At extremely lower temperatures and pressures, the membranes of the present invention may also exhibit selectivity maximums for relatively smaller gases, such as $O_2$ and $N_2$. A similar method to the one described for 6FDA-TAB/DAM above can be used to find the point at which the selectivity maximum exists for other polymeric membranes contemplated by the present invention. A series of experiments can be performed utilizing membranes comprised of polymers which have varying ratios of packing inhibitor monomers to monomers that pack well. Gases, such as $O_2/N_2$, $CO_2/CH_4$, or $C_3H_6/C_3H_8$ to name a few, can then be contacted with the membrane, and the resulting permeability and selectivity measured. These measurements can be plotted for various monomer ratios, and it can be determined if a selectivity maximum exists for any of the gasses.

Based on literature data, it is expected that the permeability of the open materials will increase with elevated feed pressure while the selectivity will decrease. This is due to plasticization, which is defined as the increase in permeability with increasing feed pressure above a certain threshold pressure value. Most polymeric membranes are susceptible to plasticization at increased feed pressures. For conventional polymeric materials, it is believed that plasticization occurs when the concentration of the penetrant molecules in the polymer matrix is high enough to facilitate polymer segmental motion. In the case of rigid ladder polymers, it is believed that plasticization occurs when a certain threshold concentration of penetrant molecules induces dilation or swelling of the polymer matrix.

Figure 6:
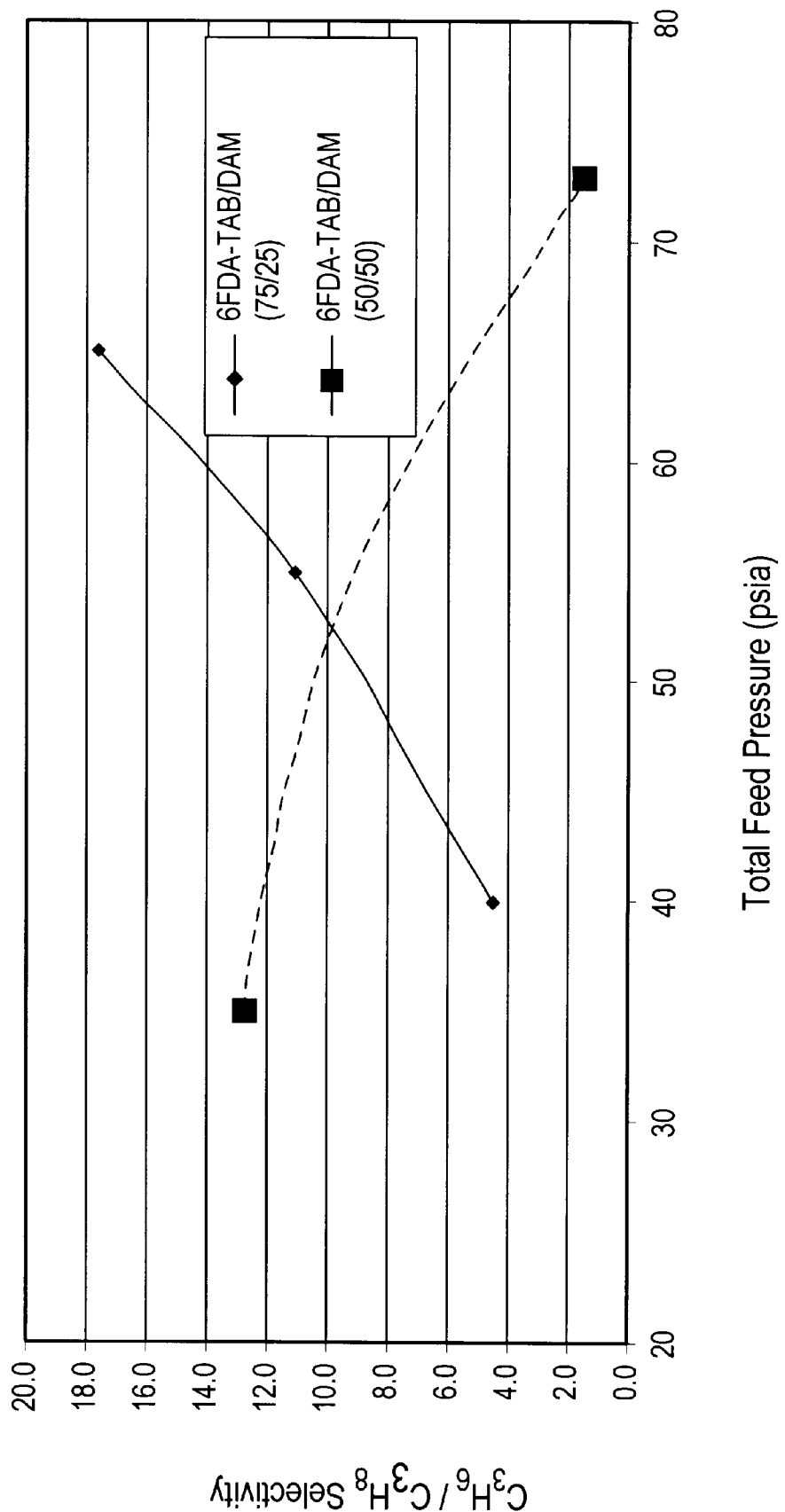
FIG. 6 shows a plot of mixed gas (50/50) $C_3H_6/C_3H_8$ selectivity vs. feed pressure.

Arguably, the most important effect of swelling induced plasticization is a decreasing selectivity at elevated feed pressures, resulting in a marked decline in membrane performance. Mixed gas permeation results for the copolymer 6FDA-TAB/DAM are given in Table 2 and FIG. 6 at different feed pressures.

TABLE 2

Mixed Gas Permeation Results for Poly(Pyrrolone-Imide) Copolymers. Feed: $C_3H_6/C_3H_8$ (50/50) at 35° C.

| Feed | 6FDA-TAB/DAM (75/25) | | 6FDA-TAB/DAM (50/50) | |
| --- | --- | --- | --- | --- |
| Pressure (psi a) | Permeability $C_3H_6$ (Barrer) | Selectivity α | Permeability $C_3H_6$ (Barrer) | Selectivity α |
| 35 | | | 2.05 | 12.7 |
| 40 | 0.19 | 4.5 | | |
| 55 | 0.79 | 11.1 | | |
| 65 | 0.85 | 17.7 | | |
| 73 | | | 3.51 | 1.5 |

6FDA-TAB/DAM (50/50) appears to behave as a conventional polymeric material at elevated feed pressures. This polymer has a reasonable $C_3H_6/C_3H_8$ mixed gas selectivity (12.7) at a low total feed pressure (35 psia). At a higher feed pressure (73 psia) this material dilates and the selectively is significantly reduced (1.5) behaving as expected.

6FDA-TAB/DAM (75/25) is a closed polymer as observed from the permeation results. Mixed gas permeation results are shown in Table 3 and FIG. 4.

TABLE 3

Pure Gas $C_3H_6/C_3H_8$ Permeability Through Copolymer 6FDA-TAB/DAM (75/25) with Varying Temperature

| Temp (C.) | Permeability $C_3H_6$ (Barrer) | Permeability $C_3H_8$ (Barrer) | α |
| --- | --- | --- | --- |
| 35 | 0.498 | 0.120 | 4.2 |
| 55 | 0.686 | 0.043 | 16.1 |

This material has a low mixed gas selectivity (4.5) at a moderate total feed pressure (40 psia). Surprisingly, this material exhibits a significant increase in selectivity (17.7) at elevated feed pressures (in this case, 65 psia). It is believed that this material utilizes the concept of swelling induced changes to lead to a desirable improvement in the intrinsic selectivity of the polymeric material. At lower feed pressures, the rigid polymer chains are well packed, and it is hypothesized that neither penetrant is able to adequately diffuse through the polymer matrix (this implies the effective diffusion coefficients of both penetrants are very small). As the feed pressure is elevated, the concentration of penetrants increases and becomes high enough to cause dilation (swelling) of polymer chains. It is speculated that this sorption induced swelling acts to open up gaps believed to act as bottleneck regions responsible for controlling the rate of diffusional jumps within the matrix. In the case of the closed materials (as opposed to conventional open materials) it is speculated that the swelling phenomena now allows propylene to diffuse at an increased rate relative to propane (the larger penetrant). Essentially, it is believed, the material is still packed to the extent that it can inhibit diffusion of the larger penetrant, providing an increase in selectivity. It is hypothesized that as the pressure is further elevated the material will undergo subsequent swelling such that the transport of the larger penetrant is also increased relative to its unplasticized value. At this point it is believed that the selectivity will begin to decrease behaving as a conventional polymer material would.

The response of these materials to increasing temperature is somewhat similar to that seen for increasing pressure. Based on literature data, it is expected that the permeability of the open materials will increase with increased temperature while it is expected that the selectivity will decrease. The temperature dependent permeability of the closed materials again behave in a surprising manner. Pure gas permeability results for the copolymer 6FDA-TAB/DAM (75/25) are shown in Table 3. It is observed that at a higher temperature (55° C.) the selectivity improves significantly. At this point the mechanism for this improvement is not clear. In the case of propane permeation, the permeability is lowered (at 55° C.) which probably suggests a decrease in the solubility coefficient that outweighs any increase in the diffusion coefficient. Conversely, for propylene the permeability (at 55° C.) increases which probably suggests an increase in the diffusion coefficient that strongly outweighs any decrease in the solubility coefficient.

It is unlikely, however, that the selectivity will continue to increase at elevated temperatures. It is speculated that at a certain temperature the propane diffusion coefficient will show an inflection versus temperature, and the selectivity will begin to decrease. Beyond this point, the material would then be behaving similar to a conventional polymer material. Such behavior suggests a maximum in selectivity will occur at some optimum temperature. This is somewhat contrary to what is expected from the Arrhenius model. The Arrhenius model predicts a constant activation energy and preexponential factor over a small range of temperatures. IN the material discussed here, it is believed over large temperature ranges these parameters change, and this is what causes a selectivity maximum. The mechanism for this selectivity maximum may be ascertained by measuring the permeability and solubility over a range of temperatures. The same procedure just described can also be used to discover the temperature and/or pressure at which selectivity maximums for certain gases occur for other membrane materials.

Additional pressure and temperature dependent gas transport experiments, both for pure and mixed gas, can be performed in order to obtain further information as to the behavior of propane/propylene and other gases at elevated temperatures and pressures. Pressure dependant permeation and sorption experiments can be performed utilizing various membrane materials in order to determine the dual mode parameters as well as the $C_3H_6/C_3H_8$ solubility selectivity and $C_3H_6/C_3H_8$ diffusivity selectivity. Based on literature data (the solubility selectivity of typical polyimides is typically 1.0–1.2), it is believed that the solubility selectivity of these materials will be close to 1, and the diffusivity selectivity should largely make up the permselectivity. Furthermore, pressure dependant studies will allow determination of the propane and propylene plasticization pressure, which can be compared to other polyimides in the literature to indicate the effect of chain rigidity on suppressing plasticization.

Temperature dependant permeation and sorption studies will allow for calculation of a temperature dependent diffusion coefficient for both propane and propylene. The activation energy for diffusion can be calculated from the slope of the logarithm of the diffusion coefficient vs. 1/T. The preexponential factor can be calculated from the intercept of the same plot. These factors also allow for the calculation of both energetic and entropic selectivity values, which can be determined for each copolymer composition. The experiments just described are not limited to studying propane/propylene, but may also be used to determine if selectivity maximums exist for other gases as well.

It is believed that the membranes of the present invention will exhibit selectivity maximums above ambient temperature, approximately 20° C., and/or ambient pressure, approximately 14.7 psi. The phrases "elevated temperatures" and "elevated pressures" refer to temperatures and pressures above ambient. However, it is believed that the selectivity maximum will most likely occur between 30° C. and 200° C. and/or 30 psi and 200 psi.

The utility of a membrane material that exhibits a selectivity maximum for certain gases as a function of temperature and/or pressure is manifest. For instance, if it is known what temperatures and pressures are most favorable for a particular process, then a membrane that exhibits a selectivity maximum for the gases involved at the desired temperature and pressure can be chosen.

Synthesis Procedure of 6FDA-TAB/DAM (50/50)

The initial step of the synthesis procedure is monomer purification. The 6FDA was obtained from Hoechst Celanese and purified by sublimation under vacuum at 220° C. The DAM monomer was purchased from Aldrich and purified by sublimation under vacuum at 85° C. The cold finger of the sublimator was kept approximately 80–100° C. below the sublimation temperature. The TAB monomer was purchased from Aldrich and purified via a recrystalization using activated carbon. The exact procedure is given in Zimmerman (1998).

Prior to polymerization, the glassware was dried under vacuum overnight at 150° C. in order to remove adsorbed water. 4A molecular sieves were activated by heating at 200° C. in vacuum overnight. Anhydrous N,N-dimethylacetamide (DMAc) and pyridine were purchased from Aldrich. The DMAc and pyridine were dried for 12 hours prior to polymerization over the activated molecular sieves under an inert (either argon or nitrogen) blanket. All solvents were transferred using transfer needles connected by Teflon tubing. The three purified monomers were dried under vacuum overnight at 50° C.

The synthesis procedure for 6FDA-TAB/DAM (50/50) poly (pyrrolone-imide) is outlined here. In order to synthesize additional TAB/DAM copolymer compositions, the monomer stoichiometry should be adjusted accordingly. All polymerization steps were done under an inert purge with continuous stirring of the reactor. The glassware was assembled and flamed with a propane torch in order to remove additional moisture. Dry TABH (3.6987 g) was added to the reaction vessel followed by approximately 100 mL DMAc. Pyridine (46 mL) was added via a syringe, and the solution became orange. DAM (2.1150 g) was dissolved in approximately 50 mL DMAc, and stirred in a 100 mL round bottom flask for at least 20 minutes under an inert blanket. The mixture was then added directly to the reaction vessel through the transfer needles. The empty flask was rinsed twice with 25 ml portions of DMAc and then transferred directly to the reaction vessel. 6FDA (11.5700 g) was dissolved in approximately 50 mL DMAc, and stirred in a 100 mL round bottom flask for at least 20 minutes under an inert blanket. The 6FDA mixture was transferred to the dropping funnel, and added to the reaction vessel at a rate of 15 drops/minute. The 6FDA flask was rinsed twice with approximately 25 mL of DMAc, and added to the dropping funnel. After final 6FDA addition, the reaction mixture was stirred under an inert purge for at least 36 hours. The polymer precursor was then precipitated into chloroform (which also acts as a solvent for the pyridine hydrochloride salt by product), and broken up in a blender. The polymer was filtered through a glass fritted funnel and washed several times with chloroform in order to remove the pyridine. The resulting polymer was dried under vacuum at no more than 50° C. for 2 days.

REFERENCES

The following references, to the extent that they provide exemplary procedural or other information or details supplementary to those set forth herein, are specifically incorporated herein by reference Petropulos, Quantitative Analysis of Gaseous Diffusion in Glassy Polymers, J. Polym. Sci, Part A-2, 8, 1970, 1797.

Vieth, Howell and Hsieh, Dual Sorption Theory, J. Memb. Sci., 1, 1976, 177.

Koros, Chan and Paul, Sorption and Transport of Various Gases in Polycarbonate, J. Memb. Sci., 2, 1977, 165.

Bondi, Physical Properties of Molecular Crystals, Liquid and Glasses, Wiley, New York, N.Y., 1968, chap. 14.

Van Krevelen, and Hoftyzer, Properties of Polymers, Their Estimation and Correlation with Chemical Structure, $2^{nd}$ Edition, Elsevier, New York, N.Y., 1976, chap. 4.

Scott et al., Polyimidazopyrrolone Reverse Osmosis Membranes, Polymer Letters, vol. 8, pp.563–571 (1970).

Walker and Koros, Transport characterization of a polypyrrolone for gas separations, Journal of Membrane Science, 55:99–117 (1991).

Koros and Walker, Gas Separation Membrane Material Selection Criteria: Weakly and Strongly Interacting Feed Component Situations, Polymer Journal, vol. 23, no. 5, pp.481–490 (1991).

Kim et al., "Relationship Between Gas Separation Properties and Chemical Structures in a Series of Aromatic Polyimides", J. Memb. Sci., 37 (1988a) 45.

Kim et al., "Advanced Gas Separation Membrane Materials: Rigid Aromatic Polyimides", J. Separation Science and Technology, 23 (1988b) 1611.

Kim, Ph.D. dissertation "Gas Sorption and Permeation in a Series of Aromatic Polyimides", 1988c.

Coleman, Ph.D. dissertation "Isomers of Fluorine Containing Polyimides for Gas Separation Membranes," 1992.

Tanaka, Taguchi, Jianquiang, Kita, and Okamoto, Permeation and separation properties of polyimide membranes to olefins and paraffins. *Journal of Membrane Science.* 1996, 121, 197–207.

Staudt-Bickel and Koros, Olefin/paraffin separation with 6FDA-based polyimide membranes, J. Membr. Sci. 170 (2000) 205.

Ilinitch, Semin, Chertova and Zamaraev, Novel polymeric membranes for separation of hydrocarbons, J. Membrane Sci., 82 (1993) 149.

Lee and Hwang, Separation of propylene and propane by polyimide hollow-fiber membrane module, J. Membrane Sci., 73 (1992) 37.

Ito and Hwang, Permeation of propane and propylene through cellulosic polymer membranes, J. Apply. Polym. Sci., (1989) 483.

Steel, Carbon Membranes for Challenging Gas Separations, Ph.D. Dissertation, The University of Texas at Austin, 2000.

Robeson, Correlation of Separation Factor Versus Permeability for Polymeric Membranes, J. Memb. Sci., 62, 1991, 165.

Zimmerman, Advanced gas separation membrane materials: Hyper rigid polymers and molecular sieve-polymer mixed matrices. Ph.D. Dissertation, The University of Texas at Austin, 1998.

Walker, Synthesis and Characterization of Polypyrrolones for Gas Separation Membranes, Ph. D. Dissertation, The University of Texas at Austin, 1993.

Bell and Jewell, Synthesis and Properties of Polyimidazopyrrolones, J. Polym. Sci., Polym. Chem. Ed., 5 (1967) 3043.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims

What is claimed is:

1. A fluid separation membrane for separating one or more components from a fluid, the fluid comprising two or more components wherein the fluid separation membrane comprises the reaction product of a tetraamine, a tetraacid compound, and a diamine and wherein the fluid separation membrane exhibits a first permselectivity with respect to the components at a first temperature and pressure, and wherein the fluid separation membrane exhibits a second permselectivity with respect to the components at a second temperature and pressure, and wherein the second permselectivity is greater than the first permaselectity when the second temperature is greater than the first temperature, the second pressure is greater than the first pressure, or the second temperature and the second pressure are greater than the first temperature and the first pressure, respectively, and wherein the diamine comprises (a) a compound having the structure:

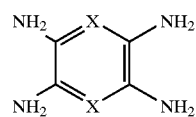

where $R_1$ and $R_3$ or $R_4$ are $NH_2$, and wherein the remaining pendant groups are H or a $C_1$ to $C_{12}$ hydrocarbon, or (b) a compound having the structure:

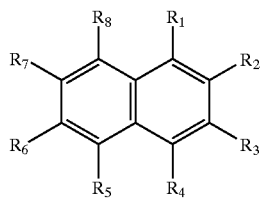

where at least two of $R_1$, $R_2$, $R_3$, $R_4$, $R_5$, $R_6$, $R_7$, and $R_8$ are $NH_2$ with the $NH_2$ groups being in an meta- or para orientation, and wherein the remaining pendant groups are H or a $C_1$ to $C_{12}$ hydrocarbon.

2. The fluid separation membrane of claim 1, wherein the tetraamine comprises an aromatic tetraamine.

3. The fluid separation membrane of claim 1, wherein the tetraamine comprises a compound having the following structure:

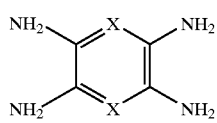

where X is C or N.

4. The fluid separation membrane of claim 1, wherein the tetraamine comprises a compound having the following structure:

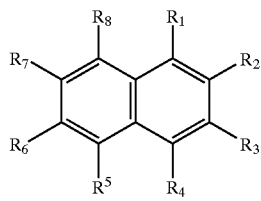

where at least one of the pairs: $R_1$ and $R_2$; $R_2$ and $R_3$; $R_3$ and $R_4$; $R_1$ and $R_8$; and $R_1$ and $R_4$ are paired amine groups; and at least one of the pairs: $R_5$ and $R_6$; $R_6$ and $R_7$; $R_7$ and $R_8$; $R_4$ and $R_5$; and $R_5$ and $R_8$ are paired amine groups.

5. The fluid separation membrane of claim 1, wherein the tetraamine comprises a compound having the following structure:

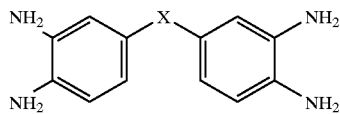

where X comprises a linking group.

6. The fluid separation membrane of claim 1, wherein the tetraacid compound comprises an aromatic tetraacid.

7. The fluid separation membrane of claim 1, wherein the tetraacid compound comprises a tetraacid dianhydride.

8. The fluid separation membrane of claim 1, wherein the tetraacid compound comprises an aromatic bis-ortho-ester-acid halide.

9. The fluid separation membrane of claim 1, wherein the tetraacid compound comprises an aromatic dianhydride having the structure:

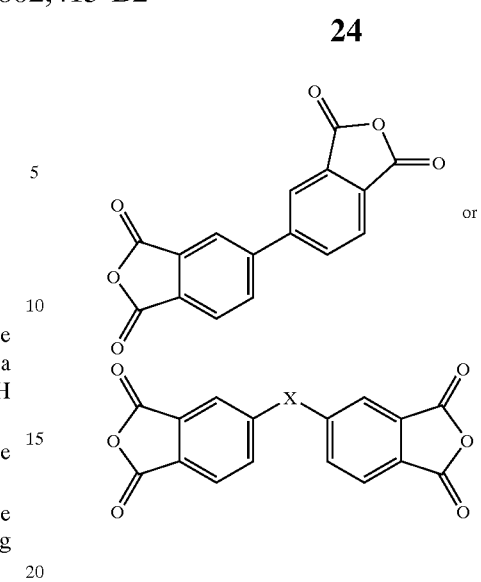

where X is $CH_2$, $C(O)$, $CH(CH_3)$, $C(CH_3)_2$, $C(CF_3)_2$, $C(CH_3)Ph$, $C(Ph)_2$, or cyclohexyl.

10. The fluid separation membrane of claim 1, wherein the tetraamine comprises a compound having the following structure:

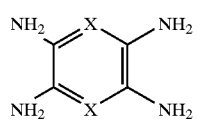

where X is C or N; and wherein the tetraacid compound comprises an aromatic dianhydride having the structure:

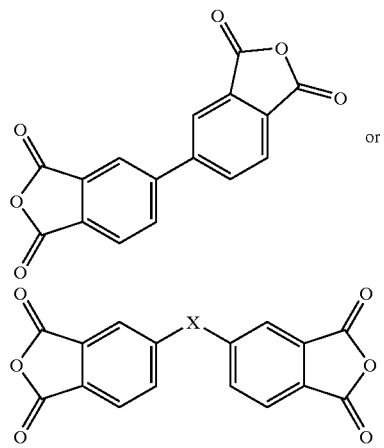

where X is $CH_2$, $C(O)$, $CH(CH_3)$, $C(CH_3)_2$, $C(CF_3)_2$, $C(CH_3)Ph$, $C(Ph)_2$, or cyclohexyl; and wherein the diamine comprises a compound having the structure:

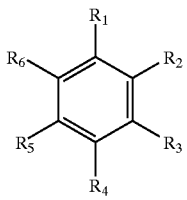

where $R_1$ and $R_3$ or $R_4$ are $NH_2$, and wherein the remaining pendant groups are H or a $C_1$ to $C_{12}$ hydrocarbon.

11. The fluid separation membrane of claim 1, wherein the reaction product comprises a polyamide.

12. The fluid separation membrane of claim 1, wherein the reaction product comprises a polypyrrolone.

13. The fluid separation membrane of claim 1, wherein the reaction product comprises a poly(pyrrolone-imide).

14. The fluid separation membrane of claim 1, wherein the tetraamine comprises 4,4'-(hexafluoroisopropylidene) diphthalic anhydride, the tetraamine comprises 1,2,4,5-tetraaminobenzene, and the diamine comprises 2,4,6-trimethyl-1,3-phenylenediamine.

15. The fluid separation membrane of claim 1, wherein the ratio of tetraamine to diamine is between about 5:95 and 100:0 by weight.

16. The fluid separation membrane of claim 1, wherein the membrane has a maximum olefin/paraffin permselectivity of 20.

17. A fluid separation membrane for separating one or more components from a fluid, the fluid comprising two or more components wherein the fluid separation membrane comprises a poly (pyrrolone-imide) polymer, and wherein the fluid separation membrane exhibits a first permselectivity with respect to the components at a first temperature and pressure, and wherein the fluid separation membrane exhibits a second permselectivity with respect to the components at a second temperature and pressure, and wherein the second permselectivity is greater than the first permaselectitity when the second temperature is greater than the first temperature, the second pressure is greater than the first pressure, or the second temperature and the second pressure are greater than the first temperature and the first pressure, respectively, and wherein the poly (pyrrolone-imide) polymer comprises recurring units, at least a portion of the recurring units having the structure I below, and at least a portion of the recurring units having the structure II below:

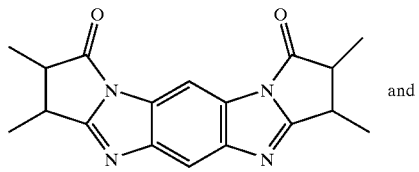

and

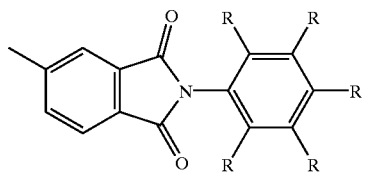

where at least one R is a nitrogen atom coupled to another recurring unit, and where the remaining R groups are H or $C_1$–$C_{12}$ hydrocarbons.

18. The fluid separation membrane of claim 17, wherein the fluid comprises a liquid.

19. The fluid separation membrane of claim 17, wherein the first pressure and the second pressure are substantially equal, and wherein the second temperature is substantially greater than the first temperature.

20. The fluid separation membrane of claim 17, wherein the first temperature and the second temperature are substantially equal, and wherein the second pressure is substantially greater than the first pressure.

21. The fluid separation membrane of claim 17, wherein the second pressure is substantially greater than the first pressure, and wherein the second temperature is substantially greater than the first temperature.

22. The fluid separation membrane of claim 17, wherein the second temperature and/or pressure is greater than the first temperature and/or pressure, and wherein the fluid separation membrane exhibits a third permselectivity with respect to the components at a third temperature and pressure, and wherein the third permselectivity is less than the second permselectivity when the third temperature and/or pressure are greater than the second temperature and/or pressure.

23. The fluid separation membrane of claim 17, wherein the fluid comprises a gas stream.

24. The fluid separation membrane of claim 17, wherein the fluid comprises a gas stream, and wherein the gas stream comprises a hydrocarbon.

25. The fluid separation membrane of claim 17, wherein the ratio of recurring units of I to recurring units of II is greater than 0 and less than about 1.

26. The fluid separation membrane of claim 17, wherein the poly (pyrrolone-imide) polymer comprises recurring units, a portion of the recurring units having the structure:

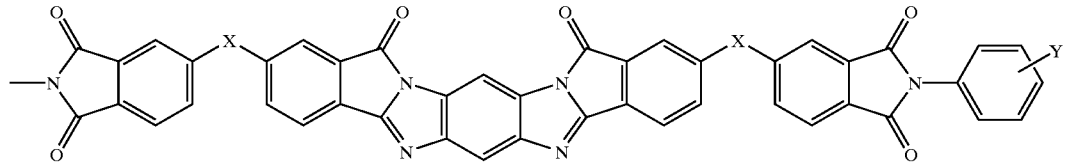

where X is a linking group, and Y is another recurring unit, where recurring unit Y is coupled to the in an ortho, meta, or para relation to the imide group.

27. The fluid separation membrane of claim 17, wherein the membrane has a propylene/propane permselectivity greater than 20.

28. The fluid separation membrane of claim 17, wherein the fluid separation membrane swells as the temperature of the fluid separation membrane is increased, and wherein the swelled fluid separation membrane exhibits a greater gas selectivity than the unswelled fluid membrane.

29. A fluid separation membrane for separating one or more components from a fluid, the fluid comprising two or more components wherein the fluid separation membrane comprises the reaction product of a tetraamine, a tetraacid compound, and a diamine and wherein the fluid separation membrane exhibits a first permselectivity with respect to the components at a first temperature and pressure, and wherein the fluid separation membrane exhibits a second permselectivity with respect to the components at a second temperature and pressure, and wherein the second permselectivity is greater than the first permaselectity when the second temperature is greater than the first temperature, the second pressure is greater than the first pressure, or the second temperature and the second pressure are greater than the first temperature and the first pressure, respectively, and wherein the diamine comprises (a) a compound having the structure:

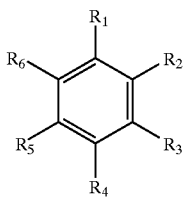

where $R_1$ and $R_3$ or $R_4$ are $NH_2$, and wherein the remaining pendant groups are H or a $C_1$ to $C_{12}$ hydrocarbon, or (b) a compound having the structure:

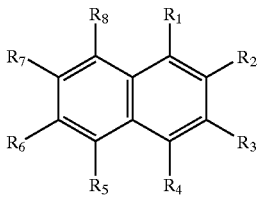

where at least two of $R_1$, $R_2$, $R_3$, $R_4$, $R_5$, $R_6$, $R_7$, and $R_8$ are $NH_2$ with the $NH_2$ groups being in an meta- or para orientation, and wherein the remaining pendant groups are H or a $C_1$ to $C_{12}$ hydrocarbon; and
  wherein the reaction product comprises a polyamide, a polypyrrolone, or a poly(pyrrolone-imide).

30. The fluid separation membrane of claim 29, wherein the tetraamine comprises an aromatic tetraamine.

31. The fluid separation membrane of claim 29, wherein the tetraamine comprises a compound having the following structure:

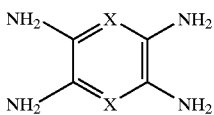

where X is C or N.

32. The fluid separation membrane of claim 29, wherein the tetraamine comprises a compound having the following structure:

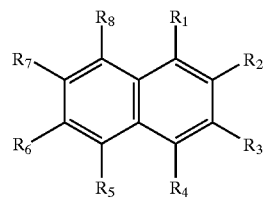

where at least one of the pairs: $R_1$ and $R_2$; $R_2$ and $R_3$; $R_3$ and $R_4$; $R_1$ and $R_8$; and $R_1$ and $R_4$ are paired amine groups; and at least one of the pairs: $R_5$ and $R_6$; $R_6$ and $R_7$; $R_7$ and $R_8$; $R_4$ and $R_5$; and $R_5$ and $R_8$ are paired amine groups.

33. The fluid separation membrane of claim 29, wherein the tetraamine comprises a compound having the following structure:

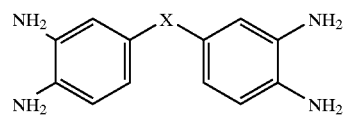

where X comprises a linking group.

34. The fluid separation membrane of claim 29, wherein the tetraacid compound comprises an aromatic tetraacid.

35. The fluid separation membrane of claim 29, wherein the tetraacid compound comprises a tetraacid dianhydride.

36. The fluid separation membrane of claim 29, wherein the tetraacid compound comprises an aromatic bis-ortho-ester-acid halide.

37. The fluid separation membrane of claim 29, wherein the tetraacid compound comprises an aromatic dianhydride having the structure:

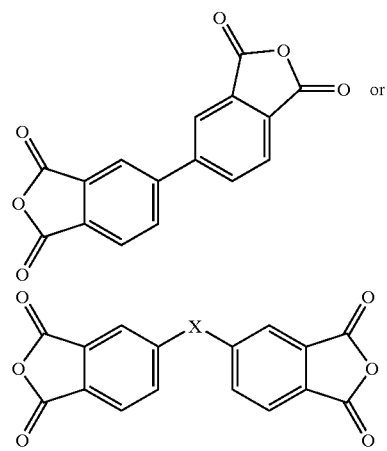

where X is $CH_2$, $C(O)$, $CH(CH_3)$, $C(CH_3)_2$, $C(CF_3)_2$, $C(CH_3)Ph$, $C(Ph)_2$, or cyclohexyl.

38. The fluid separation membrane of claim 29, wherein the diamine comprises an aromatic diamine.

39. The fluid separation membrane of claim 29, wherein the tetraamine comprises a compound having the following structure:

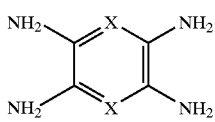

where X is C or N; and
wherein the tetraacid compound comprises an aromatic dianhydride having the structure:

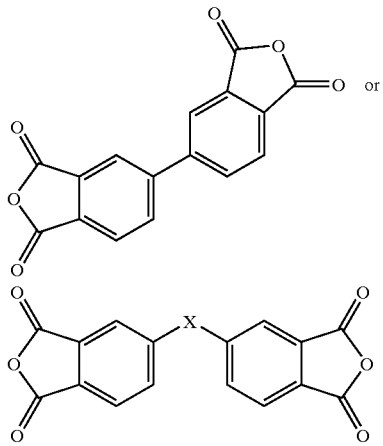

where X is $CH_2$, $C(O)$, $CH(CH_3)$, $C(CH_3)_2$, $C(CF_3)_2$, $C(CH_3)Ph$, $C(Ph)_2$, or cyclohexyl; and
wherein the diamine comprises a compound having the structure:

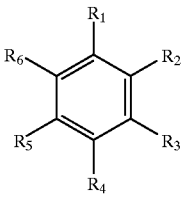

where $R_1$ and $R_3$ or $R_4$ are $NH_2$, and wherein the remaining pendant groups are H or a $C_1$ to $C_{12}$ hydrocarbon.

40. The fluid separation membrane of claim 29, wherein the tetraamine comprises 4,4'-(hexafluoroisopropylidene) diphthalic anhydride, the tetraamine comprises 1,2,4,5-tetraaminobenzene, and the diamine comprises 2,4,6-trimethyl-1,3-phenylenediamine.

41. The fluid separation membrane of claim 29, wherein the ratio of tetraamine to diamine is between about 5:95 and 100:0 by weight.

42. The fluid separation membrane of claim 29, wherein the membrane has a maximum olefin/paraffin permselectivity of 20.

* * * * *

UNITED STATES PATENT AND TRADEMARK OFFICE
CERTIFICATE OF CORRECTION

PATENT NO. : 6,602,415 B2
DATED : August 5, 2003
INVENTOR(S) : Koros et al.

It is certified that error appears in the above-identified patent and that said Letters Patent is hereby corrected as shown below:

Column 22,
Line 52, please delete "permaselectity" and substitute therefor -- "permselectivity" --.
Line 60, please delete the chemical structure
" 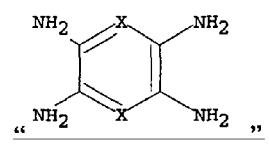 " and substitute therefor -- 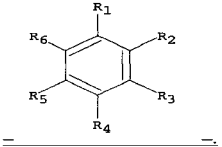 --

Column 25,
Line 45, please delete "permaselectity" and substitute therefor -- "permselectivity" --.

Column 26,
Line 66, please delete "to the in an ortho," and substitute therefor -- "in an ortho," --.

Column 27,
Line 18, please delete "permaselectity" and substitute therefor -- "permselectivity" --.

Signed and Sealed this

Twenty-fourth Day of August, 2004

JON W. DUDAS
*Director of the United States Patent and Trademark Office*